US012714630B2

(12) United States Patent
Lipshaw

(10) Patent No.: US 12,714,630 B2
(45) Date of Patent: Aug. 25, 2026

(54) HYBRID PERISTALTIC MULTI-WAVE COMPRESSION METHODS AND SYSTEMS

(71) Applicant: MEDI USA, L.P., Whitsett, NC (US)

(72) Inventor: Moses Lipshaw, Hillsborough, NC (US)

(73) Assignee: Medi USA, L.P., Whitsett, NC (US)

( * ) Notice: Subject to any disclaimer, the term of this patent is extended or adjusted under 35 U.S.C. 154(b) by 463 days.

(21) Appl. No.: 18/551,740

(22) PCT Filed: Apr. 6, 2021

(86) PCT No.: PCT/US2021/026072
§ 371 (c)(1),
(2) Date: Sep. 21, 2023

(87) PCT Pub. No.: WO2022/216277
PCT Pub. Date: Oct. 13, 2022

(65) Prior Publication Data

US 2024/0164980 A1 May 23, 2024

(51) Int. Cl.
*A61H 9/00* (2006.01)

(52) U.S. Cl.
CPC ......... *A61H 9/0078* (2013.01); *A61H 9/0007* (2013.01); *A61H 9/0092* (2013.01); *A61H 2201/0103* (2013.01); *A61H 2201/1238* (2013.01); *A61H 2201/165* (2013.01); *A61H 2201/5007* (2013.01)

(58) Field of Classification Search
CPC ...... A61H 9/00; A61H 9/0092; A61H 9/0078; A61H 9/005; A61H 9/0007; A61H 2201/0103; A61H 2201/1238; A61H 2201/165; A61H 2201/5007
See application file for complete search history.

(56) References Cited

U.S. PATENT DOCUMENTS

| | | | | |
|---|---|---|---|---|
| 6,558,338 B1 * | 5/2003 | Wasserman .......... | A61H 9/0078 601/152 |
| 6,860,862 B2 * | 3/2005 | Waldridge ........... | A61H 9/0078 601/152 |
| 7,846,114 B2 * | 12/2010 | Webster ............... | A61H 9/0078 601/152 |
| 8,465,444 B1 * | 6/2013 | Kopacki .............. | A61H 9/0092 601/152 |
| 2005/0143683 A1 | 6/2005 | Walridge et al. | |
| 2008/0097264 A1 | 4/2008 | Webster et al. | |
| 2010/0042026 A1 * | 2/2010 | Kloecker .................. | A61F 5/34 601/149 |
| 2013/0237889 A1 * | 9/2013 | Wright ................. | A61H 9/0092 601/149 |
| 2015/0032039 A1 | 1/2015 | Farrow et al. | |
| 2015/0150746 A1 * | 6/2015 | Yurko .................... | A61H 9/005 601/150 |
| 2015/0224012 A1 * | 8/2015 | Wright ................. | A61H 9/0078 601/150 |

(Continued)

*Primary Examiner* — Colin W Stuart
(74) *Attorney, Agent, or Firm* — Rimon PC

(57) ABSTRACT

The present invention relates to inflation-deflation sequence systems, programs and methods that create multiple peristaltic waves in a single sleeve to more efficiently utilize the pressure sleeve and increase therapy output cycles. These multiple peristaltic waves occur simultaneously during at least a portion of a treatment protocol in a single sleeve.

20 Claims, 8 Drawing Sheets

(56) References Cited

U.S. PATENT DOCUMENTS

| | | | | |
|---|---|---|---|---|
| 2015/0290073 | A1* | 10/2015 | Reeves | A61H 9/0078 601/149 |
| 2017/0181921 | A1* | 6/2017 | Wren | A61H 11/00 |
| 2017/0258672 | A1* | 9/2017 | Wennen | A61H 9/0078 |
| 2017/0367922 | A1 | 12/2017 | Pfeiffer | |
| 2018/0049482 | A1* | 2/2018 | Erkus | A41D 1/06 |
| 2019/0133871 | A1* | 5/2019 | Chase | A61F 13/0273 |
| 2021/0290477 | A1* | 9/2021 | Gonon | A61H 9/0092 |

* cited by examiner

HYBRID PERISTALTIC MULTI-WAVE COMPRESSION METHODS AND SYSTEMS

CROSS-REFERENCE TO RELATED APPLICATIONS

This application claims priority to Patent Cooperation Treaty Application Serial No. PCT/US2021/026072 filed Apr. 6, 2021, the contents of which is incorporated herein by reference in its entirety as if set forth verbatim.

BACKGROUND

Lymphedema is swelling that occurs when excessive protein-rich lymph fluid accumulates in the interstitial tissue. This lymph fluid may contain plasma proteins, extravascular blood cells, excess water, and parenchymal products. Lymphedema is one of the most poorly understood, relatively underestimated, and least researched complications of common diseases like cancer, and thus the prevalence of lymphedema within the general population is largely unknown. Nevertheless, for those who are diagnosed with lymphedema, the standard of care consists of meticulous skin care, manual lymphatic drainage, exercise therapy, inelastic compression bandaging and, eventually, compression garments/sleeves.

In therapy during the initial decongestive phase, manual lymphatic drainage is utilized to massage the body to move lymph fluid. The frequency and duration of care is dependent on individual subject's therapeutic need and may range from 2 to 3 visits per week for 6 or more weeks depending on the severity of lymphedema and any other associated impairment. Thereafter, during the maintenance phase, the patient must continue to utilize compression garments and/or pneumatic systems to maintain their decongested state.

The present invention addresses this and other related needs in the art.

SUMMARY

According to the presently disclosed embodiments, a method of providing compression to a subject is provided using a compression garment having a plurality of adjacent cells, comprising directing the application of two or more waves of compression in the compression garment to occur in a simultaneous manner in a treatment cycle; wherein a plurality of cells are adapted to shift between a first state of applying no or less compression to the subject and a second state of applying more compression to the subject; wherein each of the two or more waves of compression comprises an ordered sequence defined by a defined orientation in the second state in at least two cells of the plurality of adjacent cells, wherein the defined orientation in the second state in the at least two cells comprises a sequential shift to the second state from the first state in each of the at least two cells for a predetermined interval; and wherein the simultaneous manner comprises a concurrent or staggered shift to the second state in two or more non-adjacent cells of the garment, wherein at least one cell positioned between the two or more non-adjacent cells is in or is shifted to enter the first state during the concurrent or staggered shift to the second state in the two or more non-adjacent cells of the garment.

In frequently included embodiments a method is provided for providing compression therapy to a subject using a compression garment comprising two or more regions, each of the two or more regions comprised of a separate plurality of adjacent cells having a plurality of adjacent cells, the method comprising directing the application of one or more independent waves of compression in the compression garment to occur in a simultaneous manner in each of the two or more regions in a treatment cycle; wherein each cell of the plurality of cells is adapted to shift between a first state of not applying compression to the subject and a second state of applying compression to the subject; wherein each of the one or more waves of compression comprises an ordered sequence defined by a defined orientation in the second state in at least two cells of the plurality of adjacent cells in each of the two or more regions, wherein the defined orientation in the second state in the at least two cells comprises a sequential shift to the second state from the first state in each of the at least two cells for a predetermined interval; and wherein the simultaneous manner comprises a concurrent or staggered shift to the second state in one or more cells in each of the two or more regions, wherein at least one cell positioned between the two or more non-adjacent cells is in or is shifted to enter the first state during the concurrent or staggered shift to the second state in the two or more non-adjacent cells of the two or more regions.

Also in frequently provided embodiments, a method of providing therapeutic compression to a subject is provided using a pneumatic compression garment is provided comprising two or more regions, each of the two or more regions comprised of a separate plurality of adjacent cells having a plurality of adjacent cells, the method comprising directing the application of one or more independent waves of compression in the compression garment to occur in a simultaneous manner in each of the two or more regions in a treatment cycle, each of the two or more independent waves of compression being defined by a start wave time point and an end wave time point; wherein each cell of the plurality of cells is adapted to shift between a first state of not applying compression to the subject and a second state of applying compression to the subject; wherein each of the one or more waves of compression comprises an ordered sequence defined by a defined orientation in the second state in at least two cells of the plurality of adjacent cells in each of the two or more regions, wherein the defined orientation in the second state in the at least two cells comprises a sequential shift to the second state from the first state in each of the at least two cells for a predetermined interval; wherein in at least a first region of the two or more regions the simultaneous manner comprises a concurrent or staggered shift to the second state in one or more non-adjacent cells, wherein at least one cell positioned between the two or more non-adjacent cells is in or is shifted to enter the first state during the concurrent or staggered shift to the second state in the two or more non-adjacent cells of the at least first region; and wherein in at least a second region of the two or more regions the simultaneous manner comprises a concurrent or staggered shift to the second state of two or more adjacent cells in the second region, which when initiated such second state of the two or more adjacent cells in the second region is maintained until the end wave time point.

Often, the methods are a computer implemented or automated methods.

According to frequent embodiments, the application of three or more waves of compression in the compression garment in the simultaneous manner in the treatment cycle is directed according to the methods. Often, two or more treatment cycles are provided according to the present methods. Also often, three or more treatment cycles are provided according to the present methods. Also often, four or more treatment cycles are provided according to the present methods. Also often, five or more treatment cycles are provided according to the present methods.

According to frequent embodiments, each of the two or more waves of compression is defined by a start wave time point and an end wave time point, with a wave duration spanning between the start wave time point and the end wave time point. Often, a wave duration is defined by a plurality of predetermined time and/or pressure intervals. According to frequently included embodiments, the plurality of the predetermined time and/or pressure intervals comprises three or more predetermined time and/or pressure intervals.

Often according to the present embodiments the compression garment comprises two or more regions, each of the two or more regions comprised of a separate plurality of adjacent cells, and wherein two or more waves of compression in the compression garment are directed to occur in a simultaneous manner in each of the two or more regions in the treatment cycle. Also often the compression garment comprises two or more regions, each of the two or more regions comprised of a separate plurality of adjacent cells, and wherein in a first region of the two or more regions one or more cells are in the second state for the complete wave duration.

In frequently included embodiments, during an ordered sequence at least one of the at least two cells is not in the second state at any particular time between the start wave time and end wave time, and/or during the ordered sequence at least one of the at least two cells is not in the second state at a time period immediately preceding the end wave time point. Often, the compression applied to the subject in the first state is 0% to 50% of the compression applied in the second state. Also often, two or more of the plurality of adjacent cells are adapted to provide compression to the subject independent of each other. According to the present embodiments, the defined orientation is often a timed orientation, a pressure-based orientation, or a combination of a timed and pressure-based orientation.

According to frequent embodiments, a therapeutic effect of the application of the two or more waves of compression in the compression garment is monitored and an aspect of the two or more waves of compression is modified or the two or more waves of compression are continued without modification based on the results of the monitoring. Often the modifying comprises adjusting a compression level in one or more of the plurality of cells, adjusting the ordered sequence, or ending the two or more waves of compression.

In certain embodiments the method further comprises directing the application of a single wave of compression in the compression garment prior to or after the two or more waves of compression, and wherein the single wave of compression and the two or more waves of compression comprise the treatment cycle. Often, each of the two or more waves of compression is further defined by a start wave time point and an end wave time point, with a wave duration spanning between a start wave time point and an end wave time point. Also often, the wave duration is defined by a plurality of predetermined time and/or pressure intervals. Frequently the plurality of predetermined time and/or pressure intervals comprises three or more predetermined time and/or pressure intervals. Often the compression applied to the subject in the first state is 0% to 50% of the compression applied in the second state. In frequent embodiments two or more of the plurality of adjacent cells are adapted to provide compression to the subject independent of each other. Often the defined orientation is a timed orientation, a pressure-based orientation, or a combination of a timed and pressure-based orientation.

In frequent embodiments, a system is provided to conduct the methods described herein.

Also in frequent embodiments, a computer program is provided that is adapted to effect the methods described herein in a pneumatic compression sleeve. Often the computer program is embodied in software or firmware provided in operable communication with a processor and tangible storage medium, which is operably connected with the pneumatic compression sleeve.

These and other embodiments, features, and advantages will become apparent to those skilled in the art when taken with reference to the following more detailed description of various exemplary embodiments of the present disclosure in conjunction with the accompanying drawings.

BRIEF DESCRIPTION OF THE DRAWINGS

The skilled person in the art will understand that the drawings, described below, are for illustration purposes only.

Figure 1:
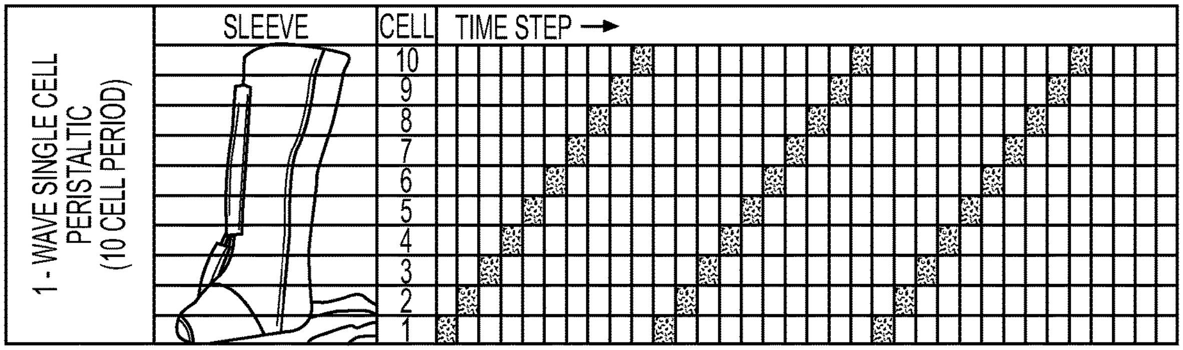
FIG. 1 depicts an embodiment of a peristaltic wave sequence where a singular pulse with a pulse width of one cell travels between subsequent cells. In the depicted embodiment, the cycle does not restart until the first cycle is complete after the 10th step.

For clarity of disclosure, and not by way of limitation, the detailed description of the invention is divided into the subsections that follow.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in the patents, applications, published applications and other publications that are herein incorporated by reference, the definition set forth in this section prevails over the definition that is incorporated herein by reference.

As used herein, "a" or "an" means "at least one" or "one or more."

As used herein, the term "and/or" may mean "and," it may mean "or," it may mean "exclusive-or," it may mean "one," it may mean "some, but not all," it may mean "neither," and/or it may mean "both."

As used herein, the term "subject" is not limited to a specific species. For example, the term "subject" may refer to a patient, and frequently a human patient. However, this term is not limited to humans and thus encompasses a variety of mammalian species.

As used herein, the term "cycle" has a broad meaning not limited to one of a series of identical or substantially similar events and instead includes a meaning encompassing a specific part of a single repetition of a series.

As used herein, the term "chamber" or "cell" refers to a portion of a compression device such as a compression sleeve. This portion may be an inflatable and/or deflatable portion or a portion adapted to provide constrictive pressure to a part of a body of a user of the garment in a manner other than through inflation/deflation such as through mechanical, electromechanical, sonic, chemical, electroactive polymer actuators, magnetic, or other means. In inflatable and/or deflatable embodiments this portion is often a hollow cavity in the sleeve that is most frequently fluid-tight apart from one or more channels provided for the introduction of fluid to/from the hollow cavity. Inflation occurs by way of the introduction of fluid (e.g., air, gas, water, etc.) to the chamber. Deflation occurs by way of removal of all or a portion of fluid (e.g., air, gas, water, etc.) from the chamber.

As used herein "sleeve" refers to a compression device adapted to surround a portion of a body of a subject. Often the portion of the body is a limb, but the term sleeve is not intended to be limited to devices for limbs and therefore encompasses such a device that can wrap entirely or partially around a portion of a body of a subject and deliver compression therapy to that or adjacent portions of the subject's body. While the sleeve may be cylindrical in shape, a variety of other adaptations are contemplated, including flat or shaped sheets that can be wrapped around a portion of a body of a subject.

As used herein, "sequence" refers to a series of sequential steps in a compression therapy protocol. Such steps may be measured by time, compression level, fluid volume, fluid flow rate, optical, among other measures. Physical aspects of the portion of the body (e.g., size, shape, tissue type, etc.) being treated often affect time, compression mechanics, and/or fluid volumes necessary to deliver varied compression levels to that portion of the body. As used herein the terms "sequence," "pulse" and "wave" are used similarly or interchangeably with differences between these terms, if any, noted in the context in which these terms are used.

As used herein, the term "step" refers to a particular or predetermined event within a series of events within a sequence.

As used herein "first state" or "deactivated" refers to a status of a cell within a sleeve where the cell is not applying compression to a portion of the body of a subject, or the compression level is at a level that the compression applied is at a predetermined non-compression level or a non-therapeutic compression level. A first state encompasses no compression, no inflation of the cell, minimal compression, or minimal fluid presence in the chamber. As described herein, cells of contemplated sleeves transition between a first state and a second state and as such a "first state" is intended to refer to a level of compression of the cell around or near to the stated level (e.g., non-compression level, minimal compression level, or minimal/residual inflation or no inflation), or approaching or departing from the stated level. In certain embodiments, the first state refers to a cell at between 0%-50% of the pressure or compression applied in the second state. Also in certain embodiments, the first state refers to a cell at compression level of between about 5 mmHg to at or about 10 mmHg, less than a compression level of 10 mmHg, or less than a compression level of 5 mmHg.

As used herein, "second state" or "activated" refers to a status of a cell within a sleeve where the cell is applying compression to a portion of the body of a subject, or the compression level is at a level that the compression applied is at a desired or predetermined compression level or a therapeutic compression level. As described herein, cells of contemplated sleeves transition between a first state and a second state and as such a "second state" is intended to refer to a level of compression of the cell around or near to a desired or predetermined compression level or approaching or departing from the desired or predetermined compression level. In certain embodiments, the second state refers to a cell at compression level of between about 20 mmHg to at or about 100 mmHg, or higher.

As used herein, "adjacent" refers to physically adjacent. For example, two cells of a sleeve of the present disclosure may be adjacent to one-another where they share a common wall, a partition, a barrier, or are not otherwise physically separated from one another by another cell or large distance.

As an example, in FIGS. 1-14, cell 1 is adjacent to cell 2; cell 2 is adjacent to cell 1 and cell 3; cell 3 is adjacent to cell 2 and cell 4; and so forth.

As used herein, "non-adjacent" refers to not physically adjacent. For example, two particular cells of a sleeve of the present disclosure may be non-adjacent to one-another when there is a cell present or positioned physically between the particular cells, or where a gap exists between the particular cells relative to the positioning of the two particular cells on a subject. As an example, in FIGS. 1-14, cell 1 is non-adjacent to any or all of cell 3 through cell 10; cell 2 is non-adjacent to any or all of cell 4 through cell 10; and so forth.

As is known in the art, edema refers to swelling associated with the accumulation and trapping of excess fluid in a fluid compartment of a body. This accumulation occurs in cells (cellular edema) or within the collagen-mucopolysaccharide matrix in the interstitial spaces (i.e., interstitial edema), and/or in other spaces in the body. Hydrostatic edema refers to excess interstitial fluid which results from elevated capillary hydrostatic pressure while permeability edema results from disruption of pore structure in the microvascular membrane such to render it less able to restrict the movement of macromolecules from the blood to interstitium. Lymphedema, as also discussed in detail herein, represents another form of edema and may result from impaired lymph pump activity, an increase in lymphatic permeability favoring protein flux from lumen to interstitial fluid, lymphatic obstruction (microfiliarisis), or as a byproduct of the removal of lymph nodes. Extracellular matrix or interstitial edema may occur as a result of aberrant changes in the pressures (hydrostatic and oncotic) across microvascular walls, alterations in endothelial wall molecular structures that occur as changes in hydraulic conductivity and the osmotic reflection coefficient for plasma proteins, or alterations in the lymphatic outflow system. Accumulation of interstitial fluid is generally regarded as detrimental to tissue function for a variety of reasons. For example, edema formation increases the diffusion distance for oxygen and other nutrients, which compromises cellular metabolism. It also limits the removal of potentially toxic byproducts of cellular metabolism.

Destruction of extracellular matrix proteins in this process due to the formation of reactive oxygen and nitrogen species and release of hydrolytic enzymes affects compliance characteristics of the interstitial matrix such that interstitial fluid pressure fails when it would otherwise normally increase to increase and thereby oppose the movement of fluid. This also negatively affects the typical tensional forces exerted by extracellular matrix proteins on anchoring filaments attached to lymphatic endothelial cells to facilitate lymphatic filling. Moreover, reductions in circulating plasma proteins, especially albumin, produce edema by decreasing plasma colloid osmotic pressure. Arteriolar vasoconstriction reduces the rise in capillary pressure that might otherwise occur in response to arterial or venous hypertension, and also acts to reduce the microvascular surface area available for fluid exchange secondary to precapillary sphincter closure. When venous pressure is elevated, the volume of blood within postcapillary venules, larger venules and veins increases and bulge into the extravascular compartment, causing an increase in tissue pressure. It is understood that even small increments in capillary pressure can result in large increases in fluid filtration rates across the microvasculature. For example, increasing capillary pressure by just 2 mmHg, as noted above in arterial hypertension, results in an initial 14-fold increase in fluid movement from the blood into the interstitium. See, e.g., Scallan et al., Capillary Fluid Exchange: Regulation, Functions, and Pathology (Morgan & Claypool Life Sciences 2010). Moreover, capillary hypertension results in the formation of a protein-poor ultrafiltrate that upon entry into the interstitial space raises interstitial fluid volume.

As such, removal of interstitial fluids characteristic of edema from swollen tissues is a goal of compression-related therapies. Providing compression to swollen tissues at optimal therapeutic levels is essential to these types of treatments. Nevertheless, often it is not known whether the compression level being applied is actually the optimum compression level, and instead a wait-and-see attitude is adopted. Even with the same type of condition or swollen tissue/limp, treatment and optimal compression levels can vary patient to patient. Though these therapies operate by providing static external pressure or compression levels, by contrast the underlying affect these compression levels have on fluid levels in interstitial fluids is dynamic. In an over-simplified manner, as fluids exit the interstitial spaces of swollen tissue, the amount of swelling in the tissue decreases. In the case of a swollen limb, the size and circumference of that limb correspondingly decreases when the swelling decreases. With the decrease in size of the limb, the size of the static compression tool (garment, wrap, sleeve, etc.) must change to be able to continue to provide a therapeutic level of compression. To-date, such changes have involved re-measurement of the limb and/or re-calculation of compression tool size based on limb size to deliver the needed compression level, without regard to the underlying pathology of the edema condition. A time, duration, and/or frequency for applying compression is provided as a treatment plan that is adjusted at irregular intervals that are not necessarily tied to the actual therapeutic effect of the treatment.

Systems of the present disclosure provide peristaltic treatment devices adapted to mimic Manual Lymphatic Drainage (MLD) for the treatment of lymphedema. Such systems are adapted to provide the peristaltic sequences set forth herein. MLD is primarily performed by lightly massaging the body by hand. As the therapist's hands move to massage different areas of the body, effectively a singular peristaltic pressure wave movement is created, and fluid is moved from filled to emptied areas of the body. Given typical MLD treatment is performed by a therapist or self-administered by the patient, the active pressure zone during MLD is limited to the body area in contact with a singular set of hands. To expand the treatment area or simultaneously treat multiple areas of the body without assistive devices, more hands or multiple therapists would be required.

Actively powered compression devices used for massage and the treatment of circulatory and swelling disorders rely on different sources of mechanical energy to apply pressures to the body. The most common source is pneumatic, where a compressor inflates and deflates impermeable bladder cells within a sleeve to apply varying levels of pressure to the wearer, much like a series of blood pressure cuffs. An example of an alternative source consists of sleeve cells fabricated from electroactive polymer actuators that change geometry and constrict when an electrical current is applied, resulting in tension driven pressure output to the wearer. Regardless of the technology utilized to generate the active compression, the cell activation sequence order within the sleeves shares similar characteristics across technologies.

One example of a cell activation sequence is a sequential fill and hold sequence that activates each cell or cell region in sequential order until all desired cells are activated to apply pressure in parallel. After a brief hold period, the cells are then deactivated in sequence or parallel to relieve pressure. This activation-deactivation cycle sequence then repeats to continue treatment. While this sequence progressively builds to efficiently utilize all cells in parallel, the first cells activated provide a longer duration of pressure than is often desired or tolerated by the wearer. These prolonged pressures during a fill and hold sequence can cause discomfort and nonconformance with the device and treatment protocol.

One example of an activation sequence to eliminate the prolonged cell pressures observed in fill and hold sequences is the use of a peristaltic wave sequence. In a peristaltic wave sequence one or more adjacent cells in a sleeve are activated in sequence. As new/additional cells are activated, previously activated cells are deactivated, which relieves pressure in areas of the deactivated cells. This creates a pressure wave effect that moves across the cells of the sleeve. The peristaltic wave sequence can be repeated to continue treatment. By deactivating cells as new cells are activated, cell pressure durations are reduced and kept similar between cells. As such, the peristaltic wave sequence is known to often resolve discomfort experienced from the prolonged pressures of the sequential fill and hold sequence method. However, by limiting cell activation sequences to a singular peristaltic wave, cells remain mostly deactivated for the duration of treatment resulting in decreased therapy cycle output and inefficient use of the sleeve.

In one exemplary system a sleeve containing a plurality of chambers/cells, for example between 3 to 32 or more chambers. In operation of the system, for example, if only one chamber of the sleeve is inflated and delivering pressure to the body at a specific (predetermined) time, then remainder of the cells remain inactive over the course of treatment. In the embodiment of a sleeve containing 32 chambers, in such a scenario 97% of the cells (i.e., 31 cells/32 total cells) remain inactive over the course of treatment. To make efficient use of a sleeve utilizing a single pressure wave, the cell inflation-deflation sequence wave often occurs rapidly to increase the frequency of inflation cycles over the course of the treatment period. Alternatively, output efficiency could also be improved by expanding the width of the wave by simultaneously or sequentially inflating multiple neighboring cells. In either case, in frequent embodiments treatment output sequences of single pressure waves are often aligned with the single therapist (i.e., single set of hands) MLD approach.

The presently contemplated embodiments embody a concept involving inflation-deflation sequence methods that create multiple peristaltic waves in a single sleeve to more efficiently utilize the pressure sleeve, increase therapy output cycles, and simulate multiple therapist MLD (i.e., multiple sets of hands). These multiple peristaltic waves occur simultaneously during at least a portion of the treatment protocol in the single sleeve. The presently contemplated embodiments also often include one or more hold & fill sequences and/or hold & fill sequences in combination with peristaltic wave sequences to form hybrid treatments. Importantly, reference to a single sleeve is for convenience purposes only as the presently contemplated treatment sequence embodiments may be provided using multiple sleeves on a single subject, while noting that in such embodiments the multiple sleeves provide multiple peristaltic waves of compression to the subject in the manner contemplated herein (e.g., multiple simultaneous peristaltic waves). As such, the exemplary sleeves and systems discussed and contemplated herein are intended to be exemplary only.

According to the most frequent embodiments of the present disclosure two or more separate and spaced waves of compression are provided simultaneously. The output of such simultaneous compression sequences is not known in the art.

As contemplated herein hold and fill and singular peristaltic wave sequences progressively advance from one or more distal zones of a sleeve to one or more proximal zones in singular fashion to move excess fluids to healthier regions of the body where they can be processed. "Decongest" or "pre-therapy" modes that limit hold and fill or peristaltic wave sequences to the proximal zones of the limb to start treatment may also form an overall treatment protocol along with multiple peristaltic waves. This approach is utilized to initially free proximal areas of the body of the subject from excess fluid in preparation to make room for moving distal fluids to the treated region. The proposed multi-wave and hybrid solutions provide for continual decongestion of proximal zones of the limb while further distal zones of the limb are treated in parallel to increase therapy cycles and therefore improve therapy outcomes over the same relative treatment periods. An equivalent MLD therapy approach would require resourcing and coordinating multiple therapists to treat each zone to achieve the same result.

As such, the presently contemplated simultaneous two or more separate and spaced waves of compression (also referred to as peristaltic sequences) may be preceded by a single wave of compression. Alternatively, the presently contemplated simultaneous two or more separate and spaced waves of compression may have a single wave of compression occur after the simultaneous two or more separate and spaced waves of compression. This single wave of compression may be provided for one or more steps of the therapeutic protocol provided the therapeutic protocol additionally includes the simultaneous two or more separate and spaced waves of compression.

Overall FIGS. 1-14 present graphs with an X-axis depicting a step, which may be a time step or a therapy step. While time may be used to measure the step, other means of measurement may be provided as such measures relate to a first state or a second state. The Y-axis refers to a cell or position in a sleeve. Each cell is provided with reference to a number, which is for reference purposes only. Generally, sequential cells are physically positioned adjacent to one-another. For example, cell 1 is adjacent to cell 2; cell 2 is adjacent to cell 3; and so forth. On the left side of each graph is a representation of an exemplary sleeve and where the cell in the embodiment may be positioned in the sleeve.

Figure 9:
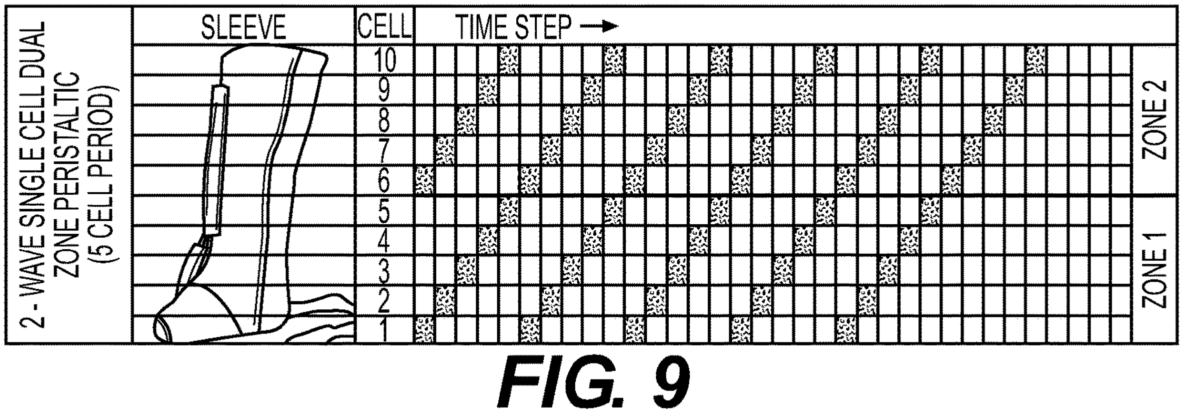
FIG. 9. depicts an embodiment of a multi-wave peristaltic sequence where two initial one cell pulse width waves are started at the 1st step.
Figure 10:
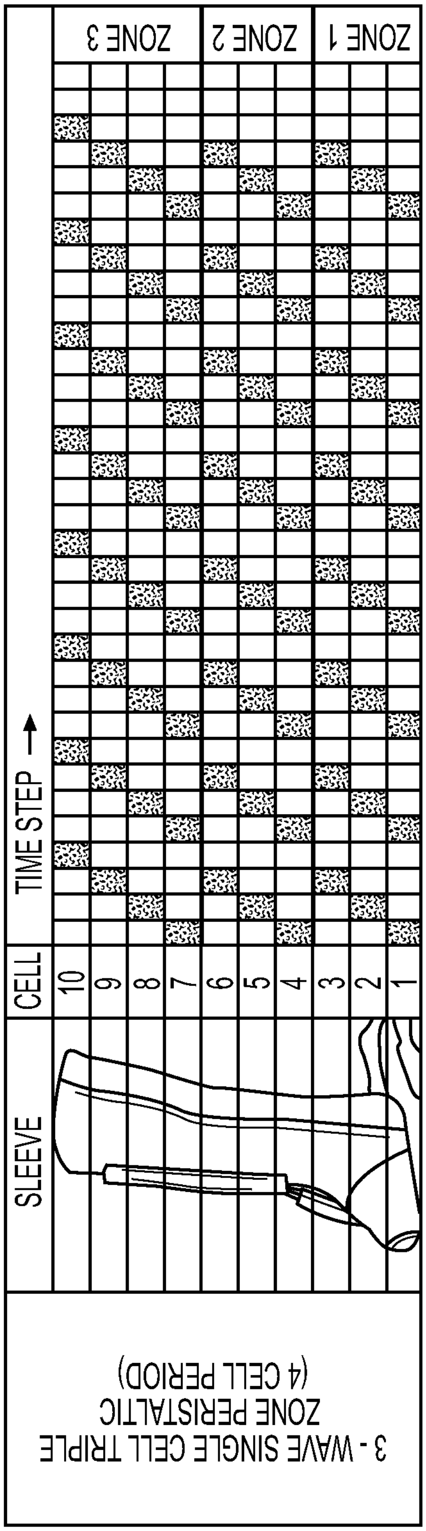
FIG. 10. depicts a multi-wave peristaltic sequence where three initial one cell pulse width waves are started at the 1st step.

In the embodiments beginning with FIG. 10, multiple zones are also indicated within the sleeve. Each zone is provided containing adjacent cells such as those identified in the Figures. As described herein, each zone may be tasked with providing a compression sequence. Therefore, multiple zones may provide for each zone having a compression sequence occurring at the same time as a compression sequence in another zone of the same sleeve, each sequence being a different sequence (i.e., different character, different compression levels, fill and hold vs. peristaltic, etc. including the embodiments of FIGS. 1-14). Nevertheless, multiple zones are not required for the presently contemplated simultaneous multi-wave compression sequences described herein.

While 10 cells are depicted in the Figures, this is for convenience purposes only. The sleeves of the presently contemplated embodiments may have fewer than 10 cells or more than 10 cells and sequences contemplated herein may make use of fewer than 10 cells or more than 10 cells. Moreover, while the X-axis depicts 34 steps, this is for convenience purposes only. Sequences of the presently contemplated embodiments may utilize fewer than 34 steps or more than 34 steps. In the graphs each square represents a status of a cell at a specific step.

In FIGS. 1-14 if the cell is empty (i.e., not colored-in), then the cell is in the first state at some point in that step. If the cell is filled-in, then the cell is in the second state at some point in that step. When multiple filled-in steps are depicted in a row, typically the cell is held in the second state through the multiple filled-in steps. Often the cell is held at a steady state pressure through these multiple steps. In certain embodiments, there is variability in pressure between the multiple steps.

FIG. 1 depicts an embodiment of a peristaltic wave sequence where a singular pulse with a pulse width of one cell travels between subsequent cells. In the depicted embodiment, the cycle does not restart until the first cycle is complete after the 10th step. In an alternative embodiment the singular pulses are arranged in closer step proximity such that the pulse noted at step 11 is begun at an earlier step in the sequence, thereby creating simultaneously occurring pulses.

Figure 2:
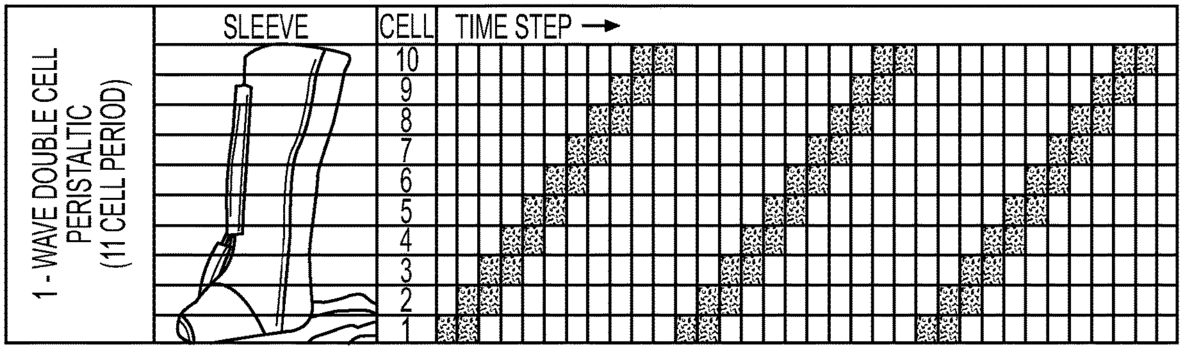
FIG. 2 depicts an embodiment of a peristaltic wave sequence where a singular pulse with a pulse width of two cells travels between subsequent cells. In the depicted embodiment, the cycle does not restart until the first cycle is complete after the 11th step.

FIG. 2 depicts an embodiment of a peristaltic wave sequence where a singular pulse with a pulse width of two cells travels between subsequent cells. In operation, cell 1 is in the second state for two sequential time steps. During the second time step, cell 2 is shifted to the second state, thereby placing cells 1 and 2 in the second state. Cell two then continues in the second state in step 3, at which point cell 1 is shifted to the first state. This cycle is repeated in sequence for each of the depicted cells. In the depicted embodiment, the cycle does not restart until the first cycle is complete after the 11th step. In an alternative embodiment the singular pulses are arranged in closer step proximity such that the pulse noted at step 11 is begun at an earlier step in the sequence, thereby creating simultaneously occurring pulses.

Figure 3:
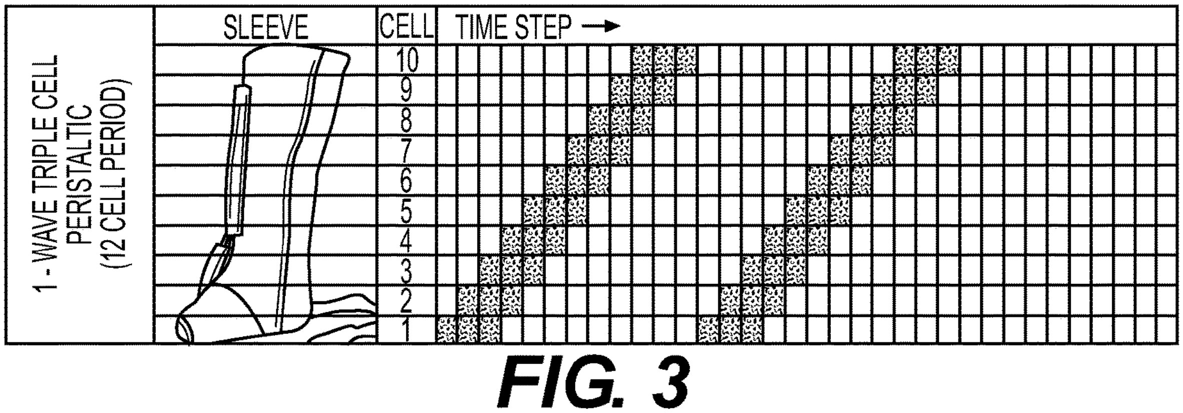
FIG. 3 depicts an embodiment of a peristaltic wave sequence where a singular pulse with a pulse width of three cells travels between subsequent cells. In the depicted embodiment, the cycle does not restart until the first cycle is complete after the 12th step.

FIG. 3 depicts an embodiment of a peristaltic wave sequence where a singular pulse with a pulse width of three cells travels between subsequent cells. In operation, cell 1 is in the second state for three sequential time steps. During the second time step, cell 2 is shifted to the second state, thereby placing cells 1 and 2 in the second state. During the third time step, cell 3 is shifted to the second state, thereby placing cells 1-3 in the second state. Each of cells 2 and 3 continue in the second state for three steps after shifting to the second state. Each of the cells is shifted to the first state after being in the second state for three steps. In the depicted embodiment, the cycle does not restart until the first cycle is complete after the 11th step. In an alternative embodiment the singular pulses are arranged in closer step proximity such that the pulse noted at step 11 is begun at an earlier step in the sequence, thereby creating simultaneously occurring pulses.

Figure 4:
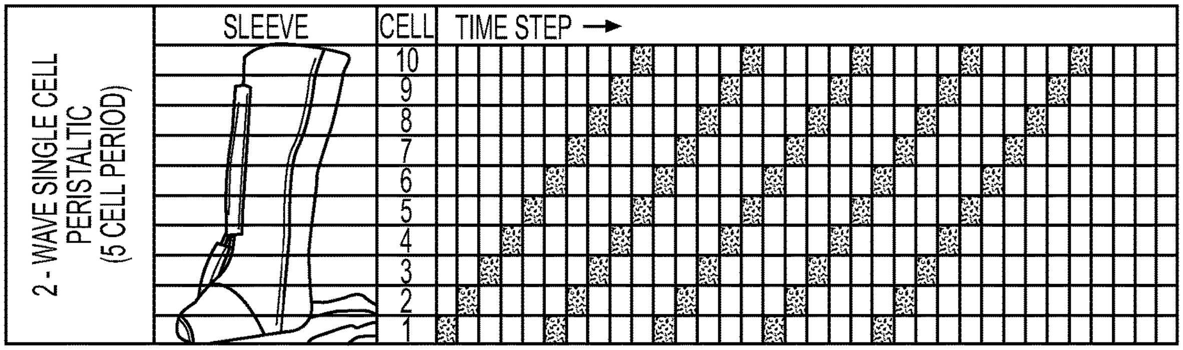
FIG. 4 depicts an embodiment of a multi-wave peristaltic sequence where an initial one cell pulse width wave is trailed by a second one cell pulse width wave starting at the 6th step.

FIG. 4 depicts an embodiment of a multi-wave peristaltic sequence where an initial one cell pulse width wave is trailed by a second one cell pulse width wave starting at the 6th step. As depicted, each cell is shifted to the second state for one step and then returned to the first state in a sequence. At step 6, cells 1 and 6 are in the second state, while the remainder of the cells are in the first state. This depicts non-adjacent cells of a sleeve in the second state separated by one or more cells in the first state. At step 7, cells 2 and 7 are in the second state, while the remainder of the cells are in the first state. At step 8, cells 3 and 8 are in the second state, while the remainder of the cells are in the first state. And, this sequence continues as depicted. In an alternative embodiment, each cell may remain active for multiple steps and/or the beginning of the second and subsequence sequences may be shifted to an earlier or later time step while maintaining multiple concurrent waves.

Figure 5:
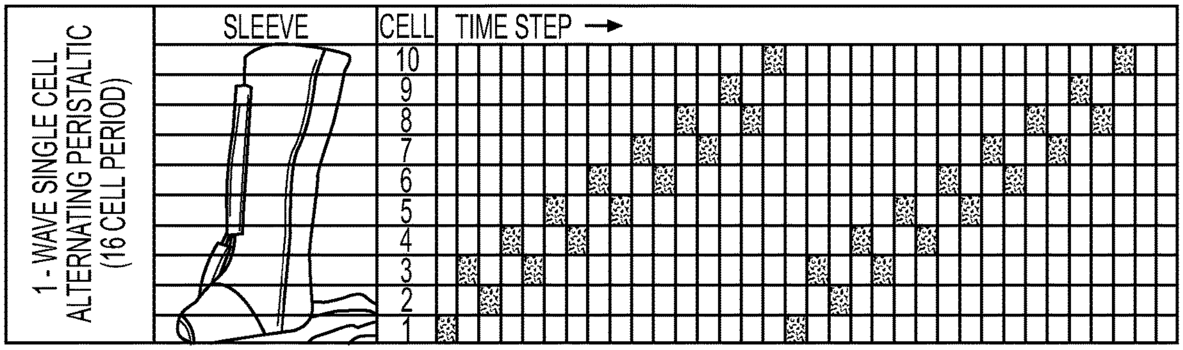
FIG. 5 depicts an embodiment of a peristaltic wave sequence with a singular one cell pulse that skips cells and changes direction before completing the cycle.

FIG. 5 depicts an embodiment of a peristaltic wave sequence with a singular one cell pulse that skips cells and changes direction before completing the cycle. As depicted, at step 1 cell 1 is shifted to the second state for one step. At step 2, cell 3 is shifted to the second state for one step. At step 2, cell 2 is shifted to the second state for one step. At step 4, cell 4 is shifted to the second state for one step. At step 5, cell 3 is shifted to the second state for one step. And this sequence continues as depicted until step 16. In the depicted embodiment, the cycle does not restart until the first cycle is complete after the 16th step. In an alternative embodiment the singular pulses are arranged in closer step proximity such that the pulse noted at step 17 is begun at an earlier step in the sequence, thereby creating simultaneously occurring pulses.

Figure 6:
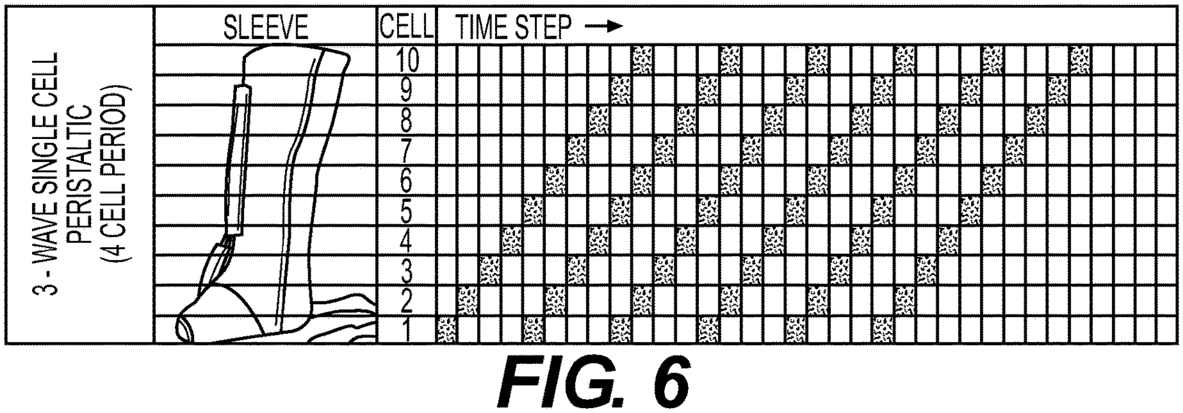
FIG. 6 depicts an embodiment of a multi-wave peristaltic sequence where an initial one cell pulse width wave is trailed by a second one cell pulse width wave starting at the 5th step and a third one cell pulse width wave starting at the 9th step.

FIG. 6 depicts an embodiment of a multi-wave peristaltic sequence where an initial one cell pulse width wave is trailed by a second one cell pulse width wave starting at the 5th step and a third one cell pulse width wave starting at the 9th step. FIG. 6 is similar to the embodiment of FIG. 4, with one fewer step between sequences. For example, the second sequence begins at step 5.

Figure 7:
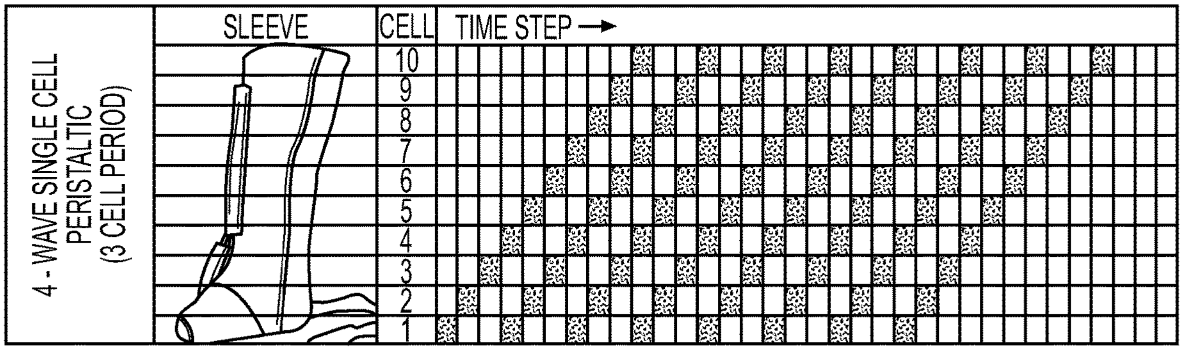
FIG. 7 depicts an embodiment of a multi-wave peristaltic sequence where an initial one cell pulse width wave is trailed by a second one cell pulse width wave starting at the 4th step, a third one cell pulse width wave starting at the 7th step, and a fourth on cell pulse width wave starting at the 10th step.

FIG. 7 depicts an embodiment of a multi-wave peristaltic sequence where an initial one cell pulse width wave is trailed by a second one cell pulse width wave starting at the 4th step, a third one cell pulse width wave starting at the 7th step, and a fourth on cell pulse width wave starting at the 10th step. FIG. 7 is similar to the embodiments of FIGS. 4 and 6, with fewer steps between sequences. For example, the second sequence of the embodiment of FIG. 7 begins at step 4.

Figure 8:
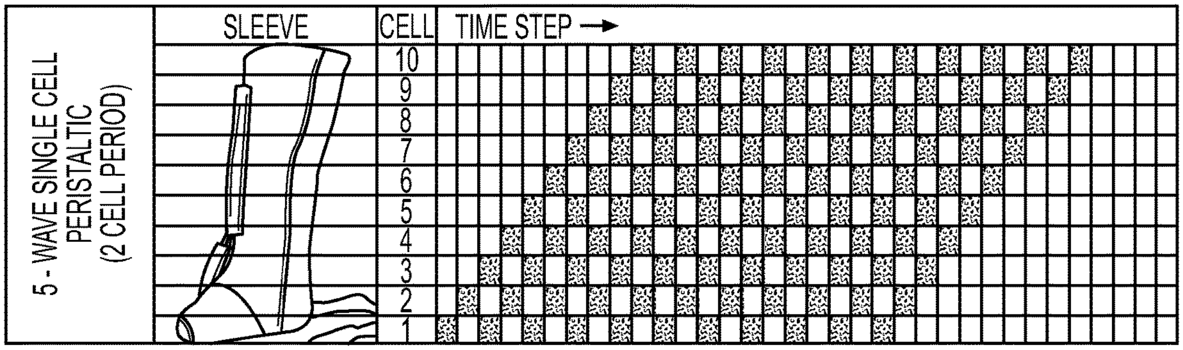
FIG. 8 depicts an embodiment of a multi-wave peristaltic sequence where an initial one cell pulse width wave is trailed by a second one cell pulse width wave starting at the 3rd step, a third one cell pulse width wave starting at the 5th step, a fourth on cell pulse width wave starting at the 7th step, and a fifth one cell pulse width wave starting at the 9th step.

FIG. 8 depicts an embodiment of a multi-wave peristaltic sequence where an initial one cell pulse width wave is trailed by a second one cell pulse width wave starting at the 3rd step, a third one cell pulse width wave starting at the 5th step, a fourth on cell pulse width wave starting at the 7th step, and a fifth one cell pulse width wave starting at the 9th step. FIG. 8 is similar to the embodiments of FIGS. 4, 6 and 7, with fewer steps between sequences. For example, the second sequence of the embodiment of FIG. 8 begins at step 3.

FIG. 9. depicts an embodiment of a multi-wave peristaltic sequence where two initial one cell pulse width waves are started at the 1st step. The sleeve of the embodiment of FIG. 9 contains two zones, which can be formally (e.g., physically) partitioned zones or zones achieved through the applied peristaltic sequences. As depicted both cell 1 and cell 6 are in the second state at step 1. At step 2, cells 2 and 7 are in the second state. At step 3, cells 3 and 8 are in the second state. And, the sequences continue as depicted.

FIG. 10. depicts a multi-wave peristaltic sequence where three initial one cell pulse width waves are started at the 1st step. The sleeve of the embodiment of FIG. 10 contains three zones, which can be formally partitioned zones or zones achieved through the applied peristaltic sequences. As depicted cells 1, 4 and 7 are in the second state at step 1. At step 2, cells 2, 5 and 8 are in the second state. At step 3, cells 3, 6 and 9 are in the second state. And, the sequences continue as depicted. While step 4 depicts only cell 10 in the second state, this cell or another cell (or multiple cells) may be in the second state at step 4.

Figure 11:
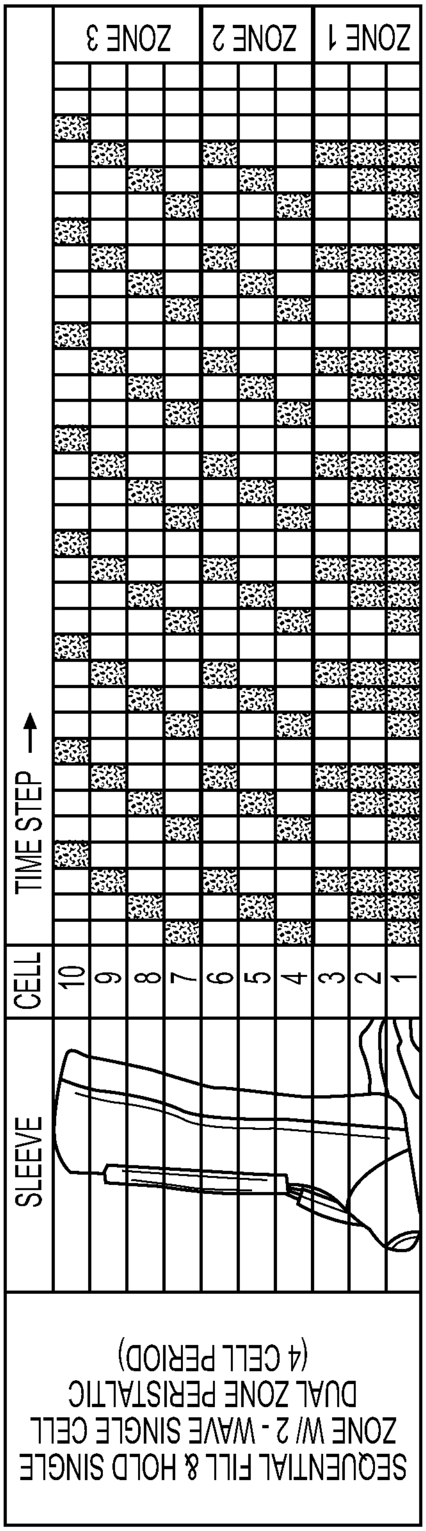
FIG. 11. depicts an embodiment of a hybrid multi-wave peristaltic sequence and sequential hold and fill sequence where two initial one cell pulse width waves are started at the 1st step along with a hold and fill sequence in cell zone 1.

FIG. 11. depicts an embodiment of a hybrid multi-wave peristaltic sequence and sequential hold and fill sequence where two initial one cell pulse width waves are started at the 1st step along with a hold and fill sequence in cell zone 1. The sleeve of the embodiment of FIG. 11 contains three zones, which can be formally partitioned zones or zones achieved through the applied peristaltic sequences. In this embodiment, two zones are subject to a peristaltic sequence and the third zone is a fill and hold sequence. As depicted, at step 1 cells 1, 4 and 7 are in the second state. At step 2, cells 1, 2, 5 and 8 are in the second state. At step 3, cells 1-3, 6 and 9 are in the second state. And, the sequences continue as depicted. While step 4 depicts only cell 10 in the second state, this cell or another cell (or multiple cells) may be in the second state at step 4. Also, the fill and hold sequence may be placed alternatively in zone 2 or zone 3, with an attendant switch of the peristaltic sequences.

Figure 12:
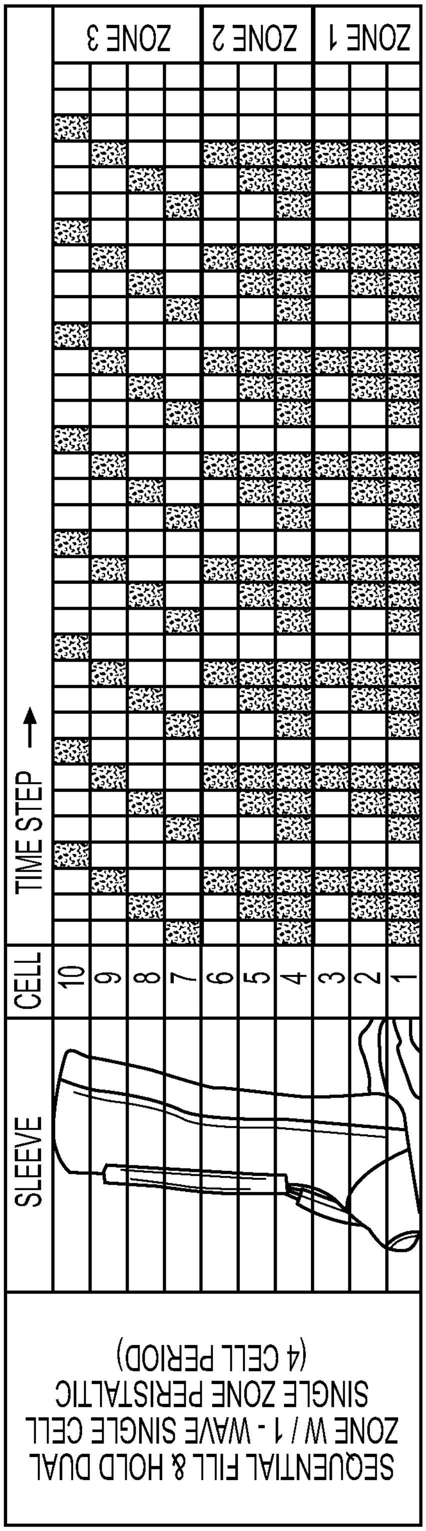
FIG. 12. depicts an embodiment of a hybrid single wave peristaltic sequence and multiple sequential hold and fill sequences where one initial one cell pulse width wave is started at the 1st step in cell zone 3 along with a hold and fill sequences in cells zones 1 & 2.

FIG. 12. depicts an embodiment of a hybrid single wave peristaltic sequence and multiple sequential hold and fill sequences where one initial one cell pulse width wave is started at the 1st step in cell zone 3 along with a hold and fill sequences in cells zones 1 & 2. The sleeve of the embodiment of FIG. 12 contains three zones, which can be formally partitioned zones or zones achieved through the applied peristaltic sequences. In this embodiment, one zone is subject to a peristaltic sequence and the other two zones are fill and hold sequences. As depicted, at step 1 cells 1, 4 and 7 are in the second state. At step 2, cells 1, 2, 4, 5 and 8 are in the second state. At step 3, cells 1-3, 4-6 and 9 are in the second state. And, the sequences continue as depicted. While step 4 depicts only cell 10 in the second state, this cell or another cell (or multiple cells) may be in the second state at step 4. Also, one fill and hold sequence may be placed alternatively in zone 3, with an attendant switch of the peristaltic sequence.

Figure 13:
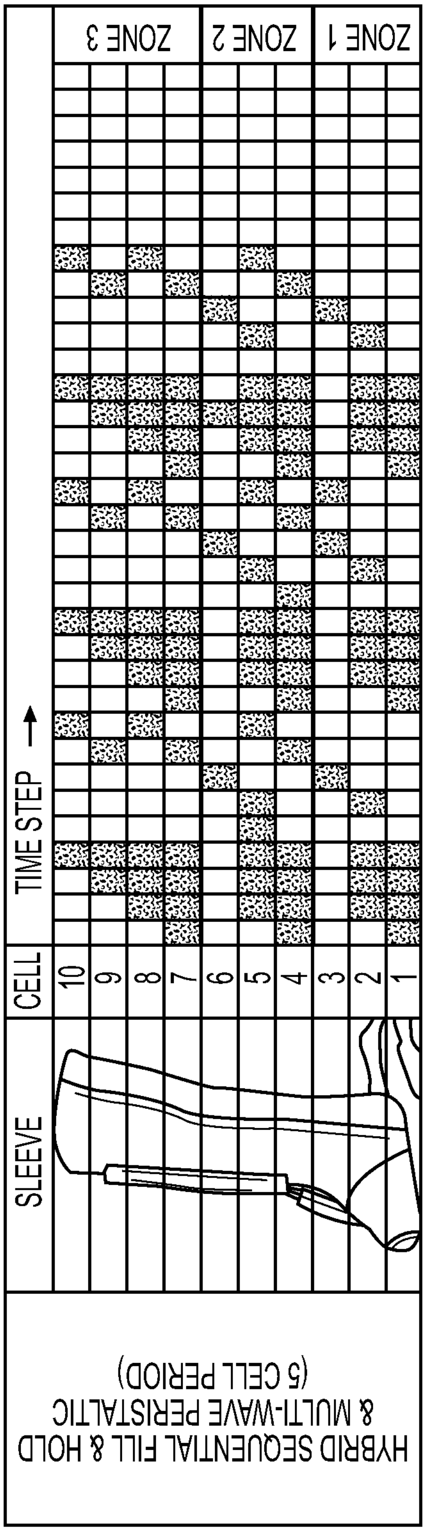
FIG. 13. depicts an embodiment of a hybrid alternating hold and fill and peristaltic wave sequence. Three partial cell zone hold and fill sequences are completed in steps 1 through 4, followed by complete deactivation in step 5, and multi-wave peristaltic sequences in steps 6 through 9.

FIG. 13. depicts an embodiment of a hybrid alternating hold and fill and peristaltic wave sequence. Three partial cell zone hold and fill sequences are completed in steps 1 through 4, followed by complete deactivation in step 5, and multi-wave peristaltic sequences in steps 6 through 9. The sleeve of the embodiment of FIG. 13 contains three zones, which can be formally partitioned zones or zones achieved through the applied peristaltic sequences. After the fill and hold sequences in each of the three zones dual peristaltic sequences are applied in steps 6-7, with a third peristaltic sequence included in step 8. After this the sequence is repeated as depicted.

Figure 14:
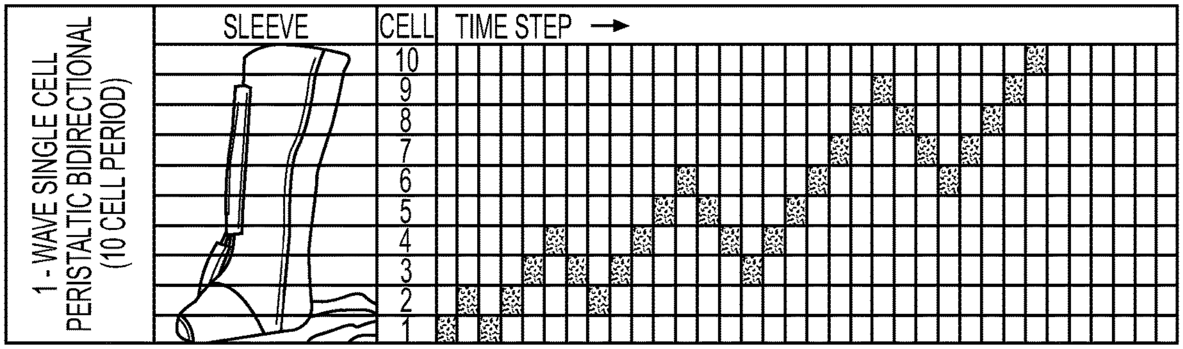
FIG. 14. depicts an embodiment of a bidirectional single wave peristaltic sequence.

FIG. 14. depicts an embodiment of a bidirectional single wave peristaltic sequence. While a single sequence is depicted, another sequence may be introduced (e.g., at step 6, step 8 or later) to shift the depicted embodiment to a multi-peristaltic sequence.

Figure 15:
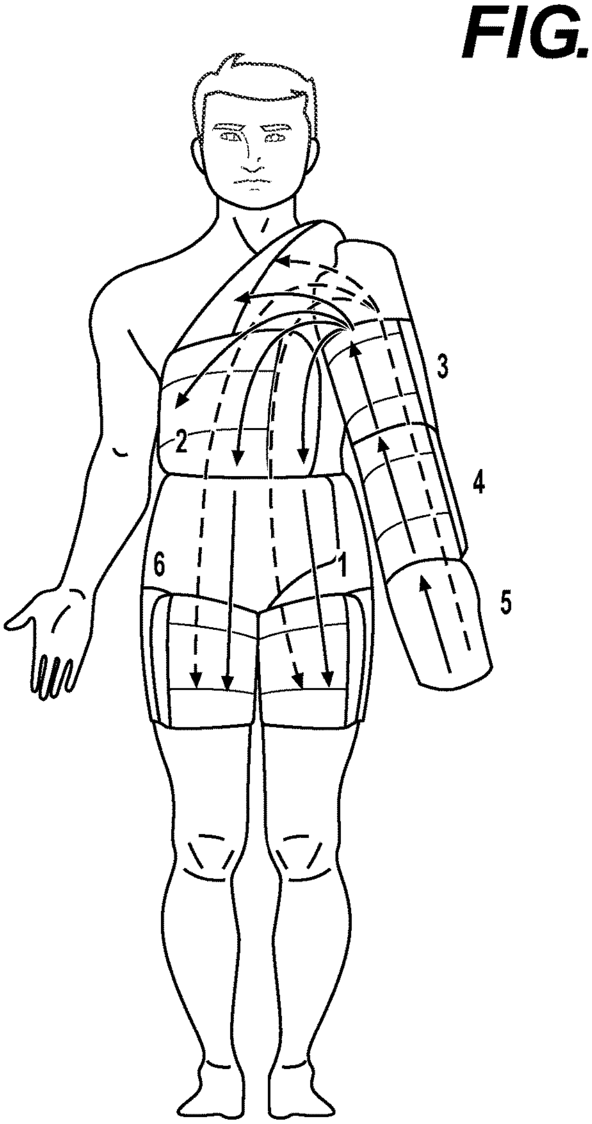
FIG. 15 depicts an exemplary torso and arm pneumatic compression sleeve, showing exemplary cell locations.
Figure 16:
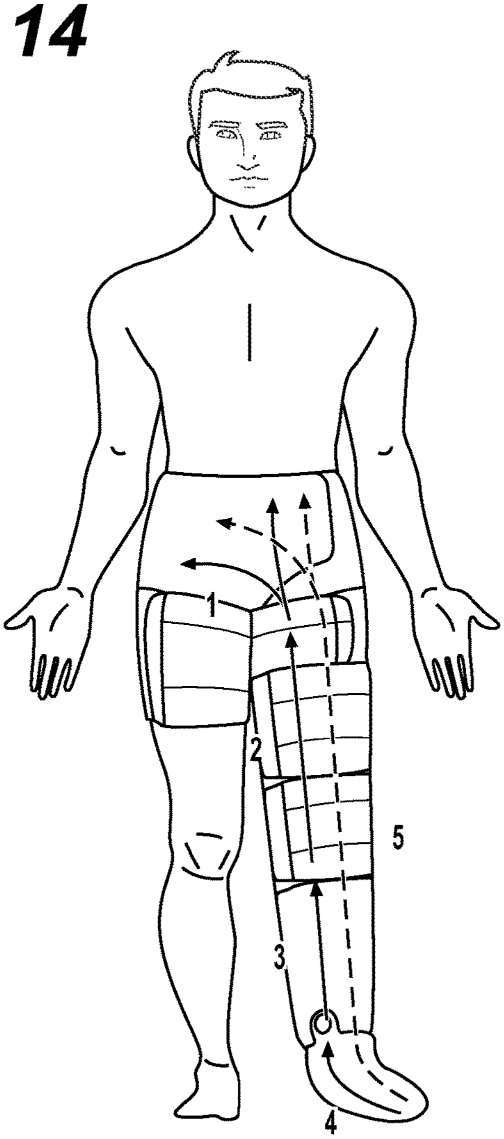
FIG. 16 depicts an exemplary hip and leg pneumatic compression sleeve, showing exemplary cell locations.
Figure 17A:
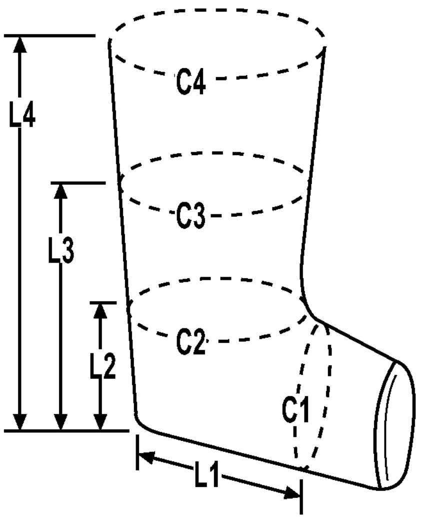
FIGS. 17A-17D depict exemplary leg sleeve schematics, showing exemplary cell locations.
Figure 17B:
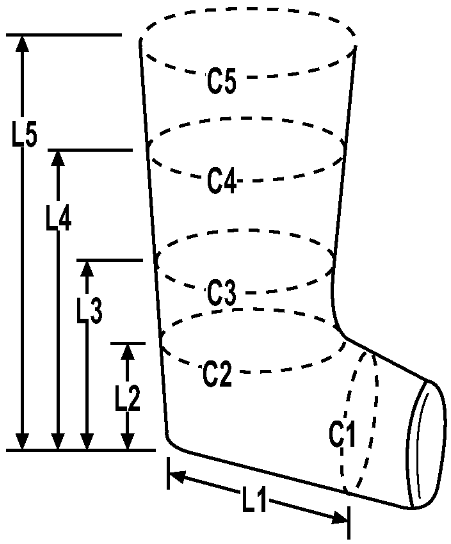
Figure 17C:
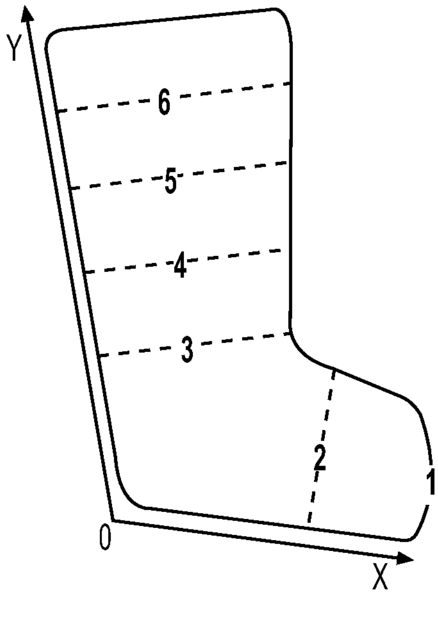
Figure 17D:
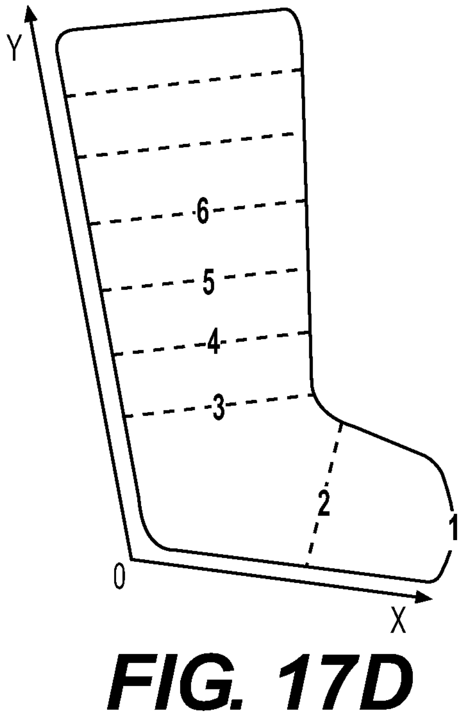
Figure 18A:
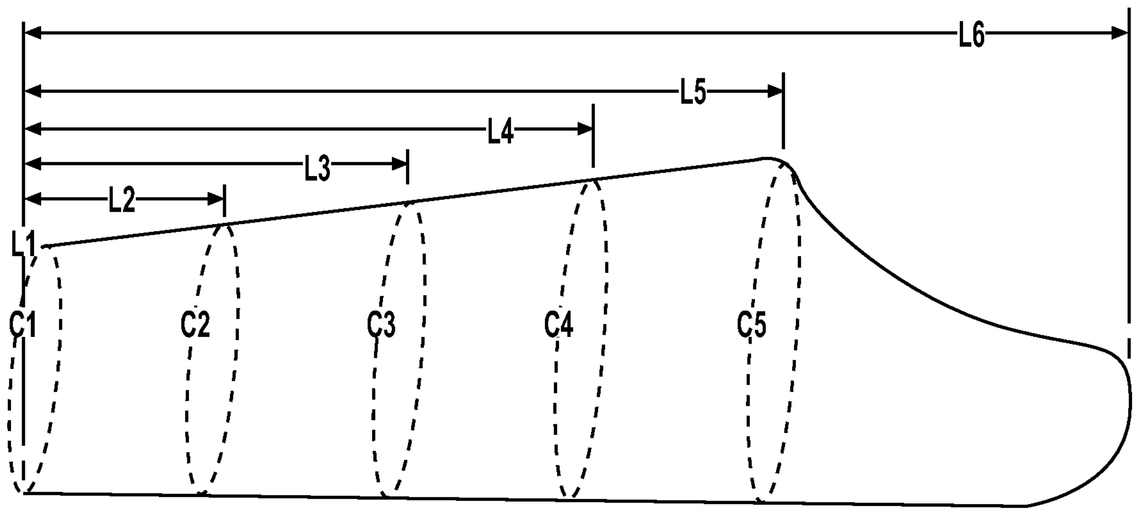
FIGS. 18A-18B depict exemplary arm sleeve schematics, showing exemplary cell locations.
Figure 18B:
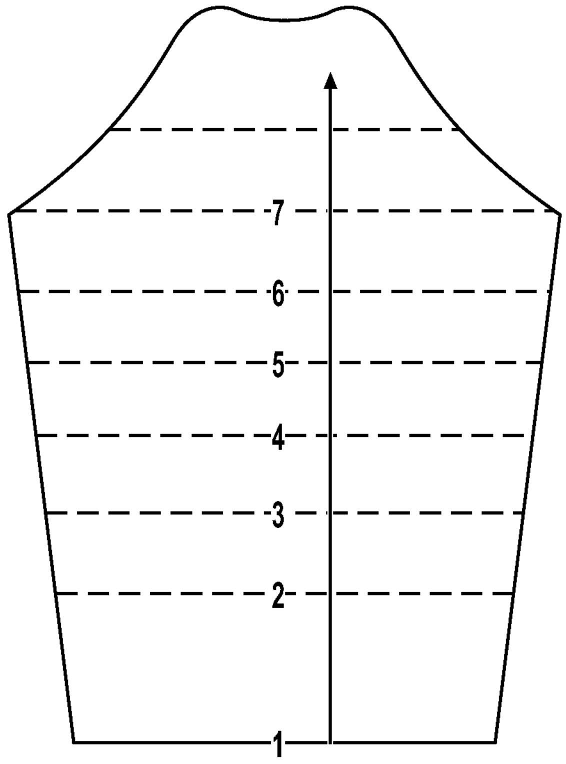

FIGS. 15 and 16 depict an exemplary torso and arm pneumatic compression sleeve and an exemplary hip and leg pneumatic compression sleeve, respectively, each showing exemplary cell locations indicated by reference numbers. FIGS. 17A-17D and 18A-18B depict exemplary arm and leg sleeve functional depictions, showing cell locations and dimensions. FIGS. 17A and 17C are lower leg sleeve functional depictions and FIGS. 17B and 17D are whole leg sleeve functional depictions. In FIGS. 17C, 17D, and 18B the number of cells are depicted by the numbers present on the Figure. Also FIGS. 17A, 17B and 18A, reference numerals C1-C5 represent circumferential distances, and L1-L5 represent length distances. While the depictions in FIGS. 15 to 18B have a limited number of cells noted, this is for convenience purposes only. In practice, the number of cells in the embodiments of FIGS. 15 to 18B may be more or fewer than the number of cells actually depicted.

FIGS. 15 to 18B are provided for illustrative purposes only since these are diagrammatic representations of sleeves contemplated herein for use with the presently contemplated systems and methods. As noted, the reference numbers on these figures indicate cell locations, while specific zones in each of the sleeves are not depicted. It is appreciated that each of the depicted sleeves in FIGS. 15 to 18B may be divided into two, three, or more zones, with each zone containing one or more cell. Such zones may be, as noted herein, actual physical partitions or zones created by virtue of the pulse, wave or sequence provided therein.

The present system and methods provide an optionally software driven compression therapy system adapted to apply pressure to the body for applications such as massage, sports recovery, and the treatment of circulatory disorders such as lymphedema, venous insufficiency, peripheral edema, dysfunction of the muscle pump, and deep vein thrombosis (DVT) prevention, venous stasis ulcers, varicose vein conditions, and discomfort from leg fatigue. One example comprises a reusable mechanical pump (e.g., diaphragm pump) for circulating and extracting fluid (e.g., gas or liquid, usually air), which is used with one or a plurality (e.g., two or more) of compression sleeves. Other means of providing compression known in the art other than using inflation-based compression are also contemplated herein for each of the present embodiments. The sleeves are worn on the body of a subject during use of the system during pressure application cycles. In operation of inflation based compression, a sleeve fills and deflates with fluid to during a pressure application cycle to provide compression to a specific area of the body of the subject/user, which generally comprises the area where the sleeve is worn. Each such exemplary compression sleeve contains integral tubing and a connector for connection to the pump, so that the pump controller may inflate and/or deflate the individual chambers of the sleeve in a predetermined sequence, e.g., as determined by the software and settings.

Software driven or automatic sequences of compression are contemplated herein for each of the recited embodiments. In such sequences, a sleeve (including the related hardware) is programmed to provide predetermined multi-wave peristaltic compression to a subject wearing the sleeve. This predetermined multi-wave peristaltic compression comprises, for example, the sequences depicted and described in connection with FIGS. 4-13, and also the sequences of FIGS. 1-3 and 14 which may be adapted to be multi-wave sequences as contemplated herein.

The user interfaces with the software through a graphical user interface (GUI) or other control methods (e.g., analog) to change settings and run treatment. The software, where present, controls the hardware interfacing through a printed circuit board with processor: a compressor, solenoid valves, pressure sensor, and clock to control the magnitude and duration of pressure to the connected sleeve(s) to perform therapy. The system may also, in certain embodiments, interface with a notification system to alert a user of the system to errors or other events such as setting changes or end of treatment.

The system optionally interfaces with other sensors, physiological monitoring systems, and/or other inputs, to perform and/or adjust therapy (together "external inputs"). For example, often the posture or physical positioning of the subject is accounted for during treatment, with pressure levels adjusted accordingly. Also, other physiological conditions could be monitored on the best time to run treatment. Such sensors may be utilized to identify therapy adjustments and/or to determine when to start or stop therapy. In this regard, an accelerometer may be employed to detect changes in posture, so that when the patient is supine and gravitational force effects on the movement of fluids reduced, the treatment is adjusted accordingly. According to another embodiment involving an external input, an ABI test routine or indicator is evaluated as a component of adjusting treatment pressures. In such embodiments, the ABI index for the subject may be a factor considered in the system for treatment pressure adjustment or whether to begin or continue treatment. For example, based on this evaluation treatment may be delayed. Also based on this evaluation, the pressure level of pressure applied to a chamber may be adjusted, initially or between cycles.

Moreover, an external pressure sensor may also be employed as an external input to monitor the environmental pressures for the system to adjust the treatment pressures and cycles accordingly (e.g., in space or water). The term "external input" is intended to be not limited to sensors that are external to the present exemplary systems and its component parts and compression sleeves nor require a physical input to provide data transfer. Also, therefore, an external input encompasses data sources that provide data input to the present exemplary systems that are embedded therein in the system architecture, or physically included with other aspects of the present exemplary systems, or obtainable by the systems. A variety of external inputs are contemplated. For example, a temperature sensor may optionally be employed as an external input to monitor skin temperature to activate or deactivate therapy based on measured skin temperature. A strain gauge may optionally be employed as an external input to detect swelling of a limb subject to treatment by the system, and to activate therapy based on this measurement. One or more external inputs may be provided in data communication with the present exemplary systems, or consulted as part of an input to the present exemplary systems for starting, stopping, or adjusting therapy using the system.

According to frequently preferred methods, a predetermined increase or relative increase to treatment pressures may be provided during an exemplary pressure adjustment phase or fitting cycle. This prevents pressures from exceeding the desired therapy pressure and optionally permits for further inflation/adjustment cycles, e.g., without removing fluid, to make further fitting adjustments.

According to a series of related embodiments, a system or device for applying compression to the body (including any specific part thereof) is provided, the system or device comprising a pump adapted to pump the fluid and a fluid pathway situated between the pump and a vent valve, wherein a check valve, a plurality of pressure valves, a pressure transducer, and an output block are provided in the fluid pathway, and wherein a system comprising the system or device includes an external input selected from one or more of an external pressure sensor, a temperature sensor, a strain gauge, and/or a means for evaluating fluid flow rates. The external input may comprise the system or device providing the input as well as the means for inputting the data to the system or device for purposes of starting, stopping, or altering a treatment regimen or cycle.

In a related exemplary method, a compression sleeve connected with an exemplary system or device is worn by a subject, and the system or device is signaled to begin, stop, or alter a treatment regimen or cycle by an external input selected from one or more of an external pressure sensor, a temperature sensor, a strain gauge, and/or a means for evaluating fluid flow rates.

A GUI is optionally used to interact with the system in frequent embodiments. Alternatively, an analog, non-graphic user interface is utilized. A GUI positioned on the housing of the PCU is included in the most frequent embodiments. In addition, in certain embodiments, a GUI is provided on a remote application, a mobile application, or other remote device. A remote device is a device positioned externally to the main system but in data communication with the system and PCU. Wired remote devices are contemplated. Remote devices in wireless data communication with the system and PCU are also contemplated. A remote device or mobile application will often provide the same functionality and/or the same or similar GUI graphics as depicted and described herein for operating the system.

In certain embodiments, a software or firmware program is provided that is adapted to provide for application of compression to a subject using a compression garment having a plurality of adjacent cells. The application of compression provided in such software or firmware program involves, for example, application of two or more waves of compression in the compression garment to occur in a simultaneous manner in a treatment cycle. In certain related embodiments, a software or firmware program is provided that is adapted to control a compression garment system such that the system conducts the methods described herein, for example, by application of two or more waves of compression in the compression garment occurring in a simultaneous manner in a treatment cycle. Such software or firmware programs are provided in a tangible storage medium, which tangible storage medium can be, or is, operably linked with one or more processors adapted to execute the operations specified in the program in such manner so as to control and/or monitor the operations of a pneumatic compression sleeve.

Certain of the information displayed and adjustable on the GUI are provided in the subsections below. The processor of the system is adapted to conduct pressure setting calculations, fitting cycles and calculations, and treatment cycles and calculations as set forth in these subsections. The processor has access to memory to provide for both data calculations and data storage related to these cycles and calculations.

The present disclosure contemplates providing a dynamic or periodic evaluation of the fluid (e.g., interstitial, venus, arterial, lymph, etc.) flow rates and/or volumes within, into and/or out of, swollen tissues before, during, and/or after compression therapy is utilized. Such an evaluation may be provided as an external input to the system contemplated herein. In related embodiments, a systemic measurement of fluid flow rates is evaluated as an alternative to or adjunct to local monitoring. Such an evaluation provides a measure of the effectiveness of the delivered therapy course and/or compression levels. The rate of fluid flow, including lymph and blood flow, within, into and/or out of, the swollen tissue is a measure of the effect the compression therapy on pressuring fluids to leave the affected area. Measuring such flow rates permits dynamic adjustment of compression levels to speed and improve clinical outcomes. The presently described systems are optimally situated to utilize such dynamic evaluations as applied compression levels can be evaluated and adjusted in a simultaneous manner to optimize the rate of fluid flow within, in or out of the swollen tissues that are the subject of the therapy. Fluid flow and volume measurements described herein may also be provided in connection with use of a compression garment with beneficial effects.

In one example of a treatment course, fluid (e.g., interstitial, venus, arterial, lymph, etc.) flow rates are evaluated during the course of a treatment protocol. For example, pressure is configured at multiple pre-determined levels and/or durations and/or sequences and the fluid flow rate into, out of, or within the treatment area is evaluated at each level to determine an optimal treatment protocol configuration. In another example, pressure is applied during a treatment cycle and the fluid flow rate into, out of, or within the treatment area is evaluated during treatment and a compression level is adjusted based on the flow rate evaluation.

Any of a variety of technologies, including combinations thereof, may be used in an interstitial, venus, arterial, or lymph flow rate evaluation according to the present disclosure. Such technologies may be provided as an external input to devices and systems of the present disclosure.

For example, pulse oximeters or photophlethysmographic devices, or adaptations thereof, may be utilized. Typically, such devices utilize a non-invasive sensor that transmits light through a patient's tissue and that photoelectrically detects the absorption and/or scattering of the transmitted light in such tissue. A sensor or probe may optionally be used to obtain a plethysmograph signal using high-pass filtering. Examples include, for example, U.S. Pat. Nos. 5,842,979, 8,577,434, 9,066,660; U.S. Pat. App. Pub. No. 20030073889.

Evaluating blood constituents in the swollen tissues to provide a measure of fluid flow rates is also contemplated. For example, hemoglobin, which is a blood component of may be measured. In this regard, an apparatus for determining concentrations of hemoglobins using a light source for emitting lights of at least three different wavelengths may be used. Such a device includes, for example, light of a first wavelength in a near-infrared wavelength region of 790 to 1000 nm, a second wavelength in a red wavelength region of 640 to 675 nm, and a third wavelength in a wavelength region of 590 to 660 nm; light receiving means for receiving lights that are emitted by the light source and transmitted through or reflected by a living tissue; an attenuation ratio processing means for processing attenuation ratios on the wavelengths based on variations of signals associated with the wavelengths output from the light receiving means, which variations are caused by a pulsation of blood; and concentration ratio processing means for processing concentration ratios of at least oxyhemoglobin, deoxyhemoglobin and carboxyhemoglobin based on the output signals from the attenuation ratio processing means. See, e.g., U.S. Pat. No. 6,415,236.

Alternatively or in addition, an infrared or near infrared imaging system used to enhance visibility of subcutaneous blood vessels may be utilized. Such systems are described, for example, in U.S. Pat. Nos. 6,556,858, 7,239,909, 9,968, 285. Such systems utilized varied imaging techniques involving illuminating body tissue with infrared light that arrives at the body tissue from a plurality of different illumination directions, or diffuse infrared light using an array of light-emitting sources. Such systems often utilize image capture means for receiving the infrared light reflected from the body tissue. In certain exemplary systems, a processor of the system is configured to alter infrared light output of the illumination devices and to determine reflectance intensities from the image frames captured by an image sensor. Output data such as dynamic tissue oxygen saturation maps may thereby be generated. Such spectroscopic techniques can be used, for example, to determine the component concentrations of a tissue, including, oxygenated hemoglobin, deoxygenated hemoglobin, and melanin.

Also, systems for detecting lymph and lymph nodes using fluorescent contrast agent are also contemplated. Such systems are described, for example, in U.S. Pat. No. 7,865,230; U.S. U.S. Pat. App. Pub. No. 20120268573. Such systems often involve directing near-infrared time-varying excitation light into the tissue of the body, causing the near-infrared time-varying excitation light to contact a lymph node of the lymphatic system, whereby a redshifted and time-varying emission light is generated, detecting the time-varying emission light at a surface of the body, filtering the time-varying emission light to reject excitation light re-emitted from the lymph node, and imaging the lymph node of the lymphatic system.

Optical coherence tomography (OCT) or functional optical coherence tomography (fOCT) also comprise contemplated technologies for use according to the present methods and in connection with the herein described systems. OCT is a non-invasive optical imaging technique that produces depth-resolved reflectance imaging through the use of a low coherence interferometer system. Three-dimensional (3D) visualization of structures in a variety of biological systems and non-biological systems not easily accessible through other imaging techniques is possible in such systems. In the present setting OCT provides a non-invasive manner of assessing fluid information without disturbing or injuring a target or sample. In such systems, low coherence light is administered using one or more wavelengths, and optical information is obtained from reflected signals. Optionally, 3D-imaging in the target is performed and flow rate of a fluid and/or a concentration of one or more target fluid constituents is determined from the acquired optical information. The rate of change of the one or more analyte concentrations in the target fluid constituent is thereby determined. fOCT employs OCT and provides a method of extracting a full set of optical properties from OCT spectra and simultaneously or substantially simultaneously extracting optical information to calculate flow rate of a fluid and a concentration of a particular target fluid constituent. Amplitude, intensity or phase, of the same OCT A-scan, are often used for determining a rate of change of the one or more target fluid constituents. Determining the rate of change of one or more analytes is often performed by comparing or using a reference such as healthy tissue or relative to a prior quantification. Such methods and systems are known in the art and can be adapted to methods and systems described herein. For example, U.S. Pat. App. Pub. Nos. 20150348287, 20070179368, 20140285812, 20160040978.

In addition to, or in lieu of, evaluating fluid flow rates, in certain embodiments the presently contemplated methods and systems are used in conjunction with methods of generating a shape of the swollen tissue derived from digital imaging of a patient body part using methods and systems described in, for example, U.S. Pat. App. Pub. No. 20180042322.

In a first embodiment a method of providing compression to a subject is provided using a compression garment having a plurality of adjacent cells, comprising directing the application of two or more waves of compression in the compression garment to occur in a simultaneous manner in a treatment cycle; wherein a plurality of cells are adapted to shift between a first state of applying no or less compression to the subject and a second state of applying more compression to the subject; wherein each of the two or more waves of compression comprises an ordered sequence defined by a defined orientation in the second state in at least two cells of the plurality of adjacent cells, wherein the defined orientation in the second state in the at least two cells comprises a sequential shift to the second state from the first state in each of the at least two cells for a predetermined interval; and wherein the simultaneous manner comprises a concurrent or staggered shift to the second state in two or more non-adjacent cells of the garment, wherein at least one cell positioned between the two or more non-adjacent cells is in or is shifted to enter the first state during the concurrent or staggered shift to the second state in the two or more non-adjacent cells of the garment.

In second embodiment the first embodiment is a computer implemented or automated method.

In a third embodiment, the first or second embodiments comprise directing the application of three or more waves of compression in the compression garment in the simultaneous manner in the treatment cycle.

In a fourth embodiment, any of embodiments 1-3 comprise two or more treatment cycles.

In a fifth embodiment, any of embodiments 1-4 include each of the two or more waves of compression being further defined by a start wave time point and an end wave time point, with a wave duration spanning between the start wave time point and the end wave time point.

In a sixth embodiment, any of embodiments 1-6 include a wave duration defined by a plurality of predetermined time and/or pressure intervals.

In a seventh embodiment, in any of embodiments 1-6 the plurality of the predetermined time and/or pressure intervals comprises three or more predetermined time and/or pressure intervals.

In an eighth embodiment, in any of embodiments 1-7 the compression garment comprises two or more regions, each of the two or more regions comprised of a separate plurality of adjacent cells, and wherein two or more waves of compression in the compression garment are directed to occur in a simultaneous manner in each of the two or more regions in the treatment cycle.

In a ninth embodiment, in any of embodiments 1-8 the compression garment comprises two or more regions, each of the two or more regions comprised of a separate plurality of adjacent cells, and wherein in a first region of the two or more regions one or more cells are in the second state for the complete wave duration.

In a tenth embodiment, in embodiment 5 during the ordered sequence at least one of the at least two cells is not in the second state at any particular time between the start wave time and end wave time, and/or during the ordered sequence at least one of the at least two cells is not in the second state at a time period immediately preceding the end wave time point.

In an eleventh embodiment, in any of embodiments 1-10, the compression applied to the subject in the first state is 0% to 50% of the compression applied in the second state.

In a twelfth embodiment, in any of embodiments 1-11, two or more of the plurality of adjacent cells are adapted to provide compression to the subject independent of each other.

In a thirteenth embodiment, in any of embodiments 1-12, the defined orientation is a timed orientation, a pressure-based orientation, or a combination of a timed and pressure-based orientation.

In a fourteenth embodiment, any of embodiments 1-13 further comprise monitoring a therapeutic effect of the application of the two or more waves of compression in the compression garment and modifying an aspect of the two or more waves of compression or continuing the two or more waves of compression without modification.

In a fifteenth embodiment, in any of embodiments 1-14 the modifying comprises adjusting a compression level in one or more of the plurality of cells, adjusting the ordered sequence, or ending the two or more waves of compression.

In a sixteenth embodiment, any of embodiments 1-6 further comprise directing the application of a single wave of compression in the compression garment prior to or after the two or more waves of compression, and wherein the single wave of compression and the two or more waves of compression comprise the treatment cycle.

In a seventeenth embodiment, a method is provided for providing compression therapy to a subject using a compression garment comprising two or more regions, each of the two or more regions comprised of a separate plurality of adjacent cells having a plurality of adjacent cells, the method comprising directing the application of one or more independent waves of compression in the compression garment to occur in a simultaneous manner in each of the two or more regions in a treatment cycle; wherein each cell of the plurality of cells is adapted to shift between a first state of not applying compression to the subject and a second state of applying compression to the subject; wherein each of the one or more waves of compression comprises an ordered sequence defined by a defined orientation in the second state in at least two cells of the plurality of adjacent cells in each of the two or more regions, wherein the defined orientation in the second state in the at least two cells comprises a sequential shift to the second state from the first state in each of the at least two cells for a predetermined interval; and wherein the simultaneous manner comprises a concurrent or staggered shift to the second state in one or more cells in each of the two or more regions, wherein at least one cell positioned between the two or more non-adjacent cells is in or is shifted to enter the first state during the concurrent or staggered shift to the second state in the two or more non-adjacent cells of the two or more regions.

In an eighteenth embodiment, embodiment 17 is a computer implemented or automated method.

In a nineteenth embodiment, any of embodiments 17-18 comprise directing the application of three or more waves of compression in the compression garment in the simultaneous manner in the treatment cycle.

In a twentieth embodiment, any of embodiments 17-19 comprise two or more treatment cycles.

In a twenty first embodiment, in any of embodiments 17-20 each of the two or more waves of compression is further defined by a start wave time point and an end wave time point, with a wave duration spanning between a start wave time point and an end wave time point.

In a twenty second embodiment, in any of embodiments 17-21 the wave duration is defined by a plurality of predetermined time and/or pressure intervals.

In a twenty third embodiment, in any of embodiments 17-22 the plurality of predetermined time and/or pressure intervals comprises three or more predetermined time and/or pressure intervals.

In a twenty fourth embodiment, in any of embodiments 17-23 the compression applied to the subject in the first state is 0% to 50% of the compression applied in the second state.

In a twenty fifth embodiment, in any of embodiments 17-24 two or more of the plurality of adjacent cells are adapted to provide compression to the subject independent of each other.

In a twenty sixth embodiment, in any of embodiments 17-25 the defined orientation is a timed orientation, a pressure-based orientation, or a combination of a timed and pressure-based orientation.

In a twenty seventh embodiment, any of embodiments 17-26 further comprise monitoring a therapeutic effect of the application of the two or more waves of compression in the compression garment and modifying an aspect of the two or more waves of compression or continuing the two or more waves of compression without modification.

In a twenty eighth embodiment, in embodiment 27 the modifying comprises adjusting a compression level in one or more of the plurality of cells, adjusting the ordered sequence, or ending the two or more waves of compression.

In a twenty ninth embodiment, any of embodiments 17-28 further comprise directing the application of a single wave of compression in the compression garment prior to or after the two or more waves of compression, and wherein the single wave of compression and the two or more waves of compression comprise the treatment cycle.

In a thirtieth first embodiment, a method of providing therapeutic compression to a subject using a pneumatic compression garment is provided comprising two or more regions, each of the two or more regions comprised of a separate plurality of adjacent cells having a plurality of adjacent cells, the method comprising directing the application of one or more independent waves of compression in the compression garment to occur in a simultaneous manner in each of the two or more regions in a treatment cycle, each of the two or more independent waves of compression being defined by a start wave time point and an end wave time point; wherein each cell of the plurality of cells is adapted to shift between a first state of not applying compression to the subject and a second state of applying compression to the subject; wherein each of the one or more waves of compression comprises an ordered sequence defined by a defined orientation in the second state in at least two cells of the plurality of adjacent cells in each of the two or more regions, wherein the defined orientation in the second state in the at least two cells comprises a sequential shift to the second state from the first state in each of the at least two cells for a predetermined interval; wherein in at least a first region of the two or more regions the simultaneous manner comprises a concurrent or staggered shift to the second state in one or more non-adjacent cells, wherein at least one cell positioned between the two or more non-adjacent cells is in or is shifted to enter the first state during the concurrent or staggered shift to the second state in the two or more non-adjacent cells of the at least first region; and wherein in at least a second region of the two or more regions the simultaneous manner comprises a concurrent or staggered shift to the second state of two or more adjacent cells in the second region, which when initiated such second state of the two or more adjacent cells in the second region is maintained until the end wave time point.

In a thirty first embodiment, embodiment 30 is a computer implemented or automated method.

In a thirty second, any of embodiments 30-31 comprise directing the application of three or more waves of compression in the compression garment in the simultaneous manner in the treatment cycle.

In a thirty third embodiment, any of embodiments 30-32 comprise two or more treatment cycles.

In a thirty fourth embodiment, any of embodiments 30-33 further comprise a wave duration spanning between a start wave time point and an end wave time point.

In a thirty fifth embodiment, in any of embodiments 30-34 the wave duration is defined by a plurality of predetermined time and/or pressure intervals.

In a thirty sixth embodiment, in any of embodiments 30-35 the plurality of predetermined time and/or pressure intervals comprises three or more predetermined time and/or pressure intervals.

In a thirty seventh embodiment, in any of embodiments 30-36 the compression applied to the subject in the first state is 0% to 50% of the compression applied in the second state.

In a thirty eighth embodiment, in any of embodiments 30-37 two or more of the plurality of adjacent cells are adapted to provide compression to the subject independent of each other.

In a thirty ninth embodiment, in any of embodiments 30-38 the defined orientation is a timed orientation, a pressure-based orientation, or a combination of a timed and pressure-based orientation.

In a fortieth fifth embodiment, any of embodiments 30-39 further comprise monitoring a therapeutic effect of the application of the two or more waves of compression in the compression garment and modifying an aspect of the two or more waves of compression or continuing the two or more waves of compression without modification.

In a forty first embodiment, in any of embodiments 30-40 the modifying comprises adjusting a compression level in one or more of the plurality of cells, adjusting the ordered sequence, or ending the two or more waves of compression.

In a forty second embodiment, any of embodiments 30-41 further comprise directing the application of a single wave of compression in the compression garment prior to or after the two or more waves of compression, and wherein the single wave of compression and the two or more waves of compression comprise the treatment cycle.

In forty third embodiment, a system is provided to conduct embodiments 1-42.

In forty fourth embodiment, a computer program adapted to effect embodiments 1-42 in a pneumatic compression sleeve.

Many variations to those methods, systems, and devices described above are possible. Since modifications and variations to the examples described above will be apparent to those of skill in this art, it is intended that this invention be limited only by the scope of the appended claims.

One skilled in the art will appreciate further features and advantages of the presently disclosed methods, systems and devices based on the above-described embodiments. Accordingly, the presently disclosed methods, systems and devices are not to be limited by what has been particularly shown and described, except as indicated by the appended claims. All publications and references cited herein are expressly incorporated herein by reference in their entirety and/or for the specific reason for which they are cited herein. Citation of the above publications or documents is not intended as an admission that any of the foregoing is pertinent prior art, nor does it constitute any admission as to the contents or date of these publications or documents.

I claim:

1. A method of providing compression to a subject using a compression garment having a plurality of adjacent cells, comprising directing the application of two or more waves of compression in the compression garment to occur in a simultaneous manner in a treatment cycle;

wherein the plurality of adjacent cells are adapted to shift between a first state of applying no or less compression to the subject and a second state of applying more compression to the subject, wherein each of the two or more waves of compression comprises an ordered sequence defined by a defined orientation in the second state in at least two cells of the plurality of adjacent cells, wherein the defined orientation in the second state in the at least two cells comprises a sequential shift to the second state from the first state in each of the at least two cells for a predetermined interval, wherein the simultaneous manner comprises a concurrent or staggered shift to the second state in two or more non-adjacent cells of the garment, wherein at least one cell positioned between the two or more non-adjacent cells is in or is shifted to enter the first state during the concurrent or staggered shift to the second state in the two or more non-adjacent cells of the garment, and wherein the method is a computer implemented or automated method.

2. The method of claim 1, wherein each of the two or more waves of compression is further defined by a start wave time point and an end wave time point, with a wave duration spanning between the start wave time point and the end wave time point, wherein the wave duration is defined by a plurality of predetermined time and/or pressure intervals, and wherein the plurality of the predetermined time and/or pressure Intervals comprises three or more predetermined time and/or pressure intervals.

3. The method of claim 2, wherein the compression garment comprises two or more regions, each of the two or more regions comprised of a separate plurality of adjacent cells, and wherein in a first region of the two or more regions one or more cells are in the second state for the complete wave duration.

4. The method of claim 1, wherein the compression garment comprises two or more regions, each of the two or more regions comprised of a separate plurality of adjacent cells, and wherein two or more waves of compression in the compression garment are directed to occur in a simultaneous manner in each of the two or more regions in the treatment cycle.

5. The method of claim 1, wherein the defined orientation is a timed orientation, a pressure-based orientation, or a combination of a timed and pressure-based orientation.

6. The method of claim 1, further comprising monitoring a therapeutic effect of the application of the two or more waves of compression in the compression garment and modifying an aspect of the two or more waves of compression or continuing the two or more waves of compression without modification, wherein the modifying comprises adjusting a compression level in one or more of the plurality of cells, adjusting the ordered sequence, or ending the two or more waves of compression.

7. The method of claim 1, further comprising directing the application of a single wave of compression in the compression garment prior to or after the two or more waves of compression, and wherein the single wave of compression and the two or more waves of compression comprise the treatment cycle.

8. A method of providing compression to a subject using a compression garment comprising two or more regions, each of the two or more regions comprised of a separate plurality of adjacent cells, the method comprising directing the application of one or more independent waves of compression in the compression garment to occur in a simultaneous manner in each of the two or more regions in a treatment cycle;

wherein each cell of the plurality of cells is adapted to shift between a first state of not applying compression to the subject and a second state of applying compression to the subject;

wherein each of the one or more waves of compression comprises an ordered sequence defined by a defined orientation in the second state in at least two cells of the plurality of adjacent cells in each of the two or more regions, wherein the defined orientation in the second state in the at least two cells comprises a sequential shift to the second state from the first state in each of the at least two cells for a predetermined interval; and wherein the simultaneous manner comprises a concurrent or staggered shift to the second state in one or more cells in each of the two or more regions, wherein at least one cell positioned between the two or more non-adjacent cells is in or is shifted to enter the first state during the concurrent or staggered shift to the second state in the two or more non-adjacent cells of the two or more regions, wherein the method is a computer implemented or automated method.

9. The method of claim 8, further comprising directing the application of three or more waves of compression in the compression garment in the simultaneous manner in the treatment cycle.

10. The method of claim 8, wherein each of the two or more waves of compression is further defined by a start wave time point and an end wave time point, with a wave duration spanning between the start wave time point and the end wave time point, and wherein the wave duration is defined by a plurality of predetermined time and/or pressure intervals.

11. The method of claim 10, wherein the plurality of predetermined time and/or pressure intervals comprises three or more predetermined time and/or pressure intervals.

12. The method of claim 8, wherein the defined orientation is a timed orientation, a pressure-based orientation, or a combination of a timed and pressure-based orientation.

13. The method of claim 8, further comprising monitoring a therapeutic effect of the application of the two or more waves of compression in the compression garment and modifying an aspect of the two or more waves of compression or continuing the two or more waves of compression without modification, wherein the modifying comprises adjusting a compression level in one or more of the plurality of cells, adjusting the ordered sequence, or ending the two or more waves of compression.

14. The method of claim 8, further comprising directing the application of a single wave of compression in the compression garment prior to or after the two or more waves of compression, and wherein the single wave of compression and the two or more waves of compression comprise the treatment cycle.

15. A method of providing compression to a subject using a compression garment comprising two or more regions, each of the two or more regions comprised of a separate plurality of adjacent cells, the method comprising directing the application of one or more independent waves of compression in the compression garment to occur in a simultaneous manner in each of the two or more regions in a treatment cycle, each of the two or more independent waves of compression being defined by a start wave time point and an end wave time point;

wherein each cell of the plurality of cells is adapted to shift between a first state of not applying compression to the subject and a second state of applying compression to the subject;

wherein each of the one or more waves of compression comprises an ordered sequence defined by a defined orientation in the second state in at least two cells of the plurality of adjacent cells in each of the two or more regions, wherein the defined orientation in the second state in the at least two cells comprises a sequential shift to the second state from the first state in each of the at least two cells for a predetermined interval;

wherein in at least a first region of the two or more regions the simultaneous manner comprises a concurrent or staggered shift to the second state in one or more non-adjacent cells, wherein at least one cell positioned between the two or more non-adjacent cells is in or is shifted to enter the first state during the concurrent or staggered shift to the second state in the two or more non-adjacent cells of the at least first region; and wherein in at least a second region of the two or more regions the simultaneous manner comprises a concurrent or staggered shift to the second state of two or more adjacent cells in the second region, which when initiated such second state of the two or more adjacent cells in the second region is maintained until the end wave time point, wherein the method is a computer implemented or automated method.

16. The method of claim 15, further comprising directing the application of three or more waves of compression in the compression garment in the simultaneous manner in the treatment cycle.

17. The method of claim 15, further comprising a wave duration spanning between a start wave time point and an end wave time point, wherein the wave duration is defined by a plurality of predetermined time and/or pressure intervals, and wherein the plurality of predetermined time and/or pressure intervals comprises three or more predetermined time and/or pressure intervals.

18. The method of claim 15, wherein the defined orientation is a timed orientation, a pressure-based orientation, or a combination of a timed and pressure-based orientation.

19. The method of claim 15, further comprising monitoring a therapeutic effect of the application of the two or more waves of compression in the compression garment and modifying an aspect of the two or more waves of compression or continuing the two or more waves of compression without modification, wherein the modifying comprises adjusting a compression level in one or more of the plurality of cells, adjusting the ordered sequence, or ending the two or more waves of compression.

20. The method of claim 15, further comprising directing the application of a single wave of compression in the compression garment prior to or after the two or more waves of compression, and wherein the single wave of compression and the two or more waves of compression comprise the treatment cycle.

* * * * *